United States Patent [19]

Kataoka et al.

[11] Patent Number: 5,576,753
[45] Date of Patent: Nov. 19, 1996

[54] IMAGE FORMING APPARATUS WHICH PERFORMS REGISTRATION CORRECTION FOR PLURAL IMAGE

[75] Inventors: Tatsuhito Kataoka, Tokyo; Hiroyuki Takahashi; Motoaki Tahara, both of Kawasaki, all of Japan

[73] Assignee: Canon Kabushiki Kaisha, Tokyo, Japan

[21] Appl. No.: 93,693

[22] Filed: Jul. 20, 1993

[30] Foreign Application Priority Data

Jul. 30, 1992 [JP] Japan .................................. 4-203971

[51] Int. Cl.⁶ ..................................................... H04N 1/21
[52] U.S. Cl. ........................................... 347/248; 358/296
[58] Field of Search .................................. 347/248, 247, 347/234, 237; 358/296, 298, 300, 302

[56] References Cited

U.S. PATENT DOCUMENTS 4,903,067  2/1990  Murayama et al. ..................... 355/271
5,241,400  8/1993  Itagaki ..................................... 358/401
5,394,223  2/1995  Hart et al. ............................... 355/212

Primary Examiner—Mark J. Reinhart
Attorney, Agent, or Firm—Fitzpatrick, Cella, Harper & Scinto

[57] ABSTRACT

An image forming apparatus includes a device for forming an image; a device for detecting information relating to the image formed by the image forming device and for repeating the detection; and a device for determining a timing at which the detection is repeated by the detecting device on the basis of the information detected by the detecting device. A device for generating a pattern signal corresponding to a predetermined pattern for detecting the amount of registration deviation by the detecting device is also provided. In addition, a transport belt for transporting the recording medium through the plurality of image forming units is provided so that the image forming units also form predetermined images on the transport belt. A device is also provided for mechanically and/or electrically correcting registration in the image forming units on the basis of the amount of registration deviation detected by the detecting device.

56 Claims, 31 Drawing Sheets

$$X_c = \frac{X_1 + X_2}{2}$$

$$X_c = \frac{X_3 + X_4}{2}$$

ROT = 000

ROT = 001

ROT = 010

ROT = 011

ROT = 100

ROT = 101

ROT = 110

ROT = 111

IMAGE FORMING APPARATUS WHICH PERFORMS REGISTRATION CORRECTION FOR PLURAL IMAGE

BACKGROUND OF THE INVENTION

1. Field of the Invention

The present invention relates to an image forming apparatus and, more particularly, to an image forming apparatus which has a plurality of image carriers and is capable of superimposing and forming images (e.g., images for each color), which are formed on each of image carriers, on a recording medium.

2. Description of the Related Art

An image forming apparatus has been proposed which has a plurality of recording units (for example, laser beam printers) in which each recording unit irradiates a laser beam modulated in accordance with record information onto a photosensitive drum, develops an electrostatic latent image on the photosensitive drum by an electrophotographic process, and transfers the image to a transfer paper. Each color image is transferred and superimposed during transport of the transfer paper through the recording units by means of a transfer belt, thereby making it possible to form a multi-color image.

In this type of image forming apparatus, if there are mechanical mounting errors between the photosensitive drums, optical path length errors between the light beams, or changes in the optical path between the light beams, the images for each color formed by forming electrostatic latent images on the various photosensitive drums, and then developing and transferring them on the recording paper on the transfer belt, will not be registered correctly. For this reason, a pattern image for registration correction is read by an image sensor such as a CCD sensor, and the pattern image is transferred onto a transfer belt from the various photosensitive drums. The position of the registration correction pattern for each color is determined on the basis of the density values of the read data. Registration deviations on the photosensitive drum respectively corresponding to each of the colors are detected on the basis of the thus determined position. Image signals to be recorded are subjected to electrical corrections in accordance with the detected deviations, and/or a reflection mirror disposed in the optical path of the light beams is driven to correct changes in the optical path length or the optical path.

The image processing section of the image forming apparatus may read out data which has been written in a memory in block units (for example, block unit compression). The relative position of the blocks to be read is not varied in accordance with the amount of deviation in a plurality of image forming means.

However, since registration corrections are performed at set timings (such as at fixed time intervals or when a fixed number of images have been formed), the above-described image forming apparatus has a problem in that it does not account for cases in which, for example, the temperature of the machine increases when the machine is powered on or when the machine is moved. Since changes in registration deviations are large in such conditions, temporary registration variations occur.

In a case in which pattern images for registration correction, which are transferred on a transfer belt from the respective corresponding photosensitive drums, are read by a CCD sensor or the like, the read pattern images are stored in a memory, and the positions of the registration correction patterns for each color are determined on the basis of the density values of the read data in accordance with pattern image data read out sequentially from the memory. In such a case, when the transferred registration correction pattern image cannot be formed clearly due to changes in the environment, or changes in the process conditions such as latent imaging, development or transfer of images, or when an image is formed on scratches or contaminants on the transfer belt, the central position of the registration correction image is erroneously computed on the basis of the read data. As a consequence, an error occurs in the computation of registration deviations of each color, causing the registration to deviate.

For example, when an image is formed normally on the transfer belt, the histogram data of the density additions regarding a pattern image in the main-scanning and sub-scanning directions is distributed as shown in FIG. 8. The position of the maximum value of the histogram data matches the central position of the histogram, making it possible to easily compute the central value. However, when the transfer conditions vary as shown in FIG. 30, for example, when data is lost during transfer, causing the density in the central portion to be higher than that in the edge portion of the image pattern, or when a scratch is present on the transfer belt as shown in FIG. 31, the maximum value of the histogram does not match the central value of the image pattern. Therefore, the central position of the registration correction image is erroneously computed on the basis of the read data.

In addition, when data written in a memory in block units is read out in block units by the image processing section of the above-described image forming apparatus, and when the image forming section has a plurality of image forming means as described above, registration deviations cannot be adjusted in pixel units since the registration deviations are only adjusted in block units.

SUMMARY OF THE INVENTION

Accordingly, it is an object of the present invention to provide an image forming apparatus which is capable of always performing proper registration correction on a registration condition which varies continuously, thus preventing registration deviations of images.

It is another object of the present invention to provide an image forming apparatus which is capable of correcting registration deviations of each image carrier with a high degree of accuracy irrespective of scratches on a belt or changes in the process conditions by a method in which the central position of a registration correction mark is determined with a high degree of accuracy, and in which information on registration deviations of each color is computed accurately on the basis of the obtained information on the central position.

It is still another object of the present invention to provide an image forming apparatus which is capable of obtaining a high-quality image by correcting registration deviations not only in block units, but also in pixel units.

According to one aspect of the present invention, a registration correction pattern image is read for each color, the position and shape of the read pattern is computed, a deviation of each color from a reference color is computed on the basis of the result of this computation, and the timing at which a series of registration corrections are performed is controlled in accordance with the deviations of each color. Therefore, it is possible to always perform proper registration correction on the registration condition which varies continuously, thus preventing registration deviations of the images.

According to another aspect of the present invention, a registration correction image mark transferred onto a transport member is read, addition histogram data is created on the basis of the read density data of the read registration correction image mark, the histogram data is binarized by a threshold value, and the central position of each registration correction mark is determined on the basis of the binarized data. As a result, the central position of the registration correction mark is determined with a high degree of accuracy irrespective of scratches on a belt or changes in the process conditions, and information on the registration deviations of each color is accurately computed on the basis of the obtained central position information. Thus, registration deviations of each image carrier are corrected with a high degree of accuracy.

According to still another aspect of the present invention, registration deviations of each of a plurality of image forming means is detected. These registration deviations are corrected not only in block units but also in pixel units, and thus a high-quality image can be obtained.

According to yet another aspect of the present invention, an image forming apparatus includes a device for forming an image; a device for detecting information relating to the image formed by the image forming device and for repeating the detection; and a device for determining a timing at which the detection is repeated by the detecting device on the basis of the information detected by the detecting device.

According to yet another aspect of the present invention, an image forming apparatus includes a device for generating a pattern signal corresponding to a predetermined pattern; an image forming device for forming the predetermined pattern in response to a pattern signal generated by the generating device; a device for detecting the predetermined pattern formed by the image forming device; a device for generating a histogram on the basis of an output from the the detecting device; and a device for correcting positions at which images are formed by the image forming device on the basis of the histogram generated by the histogram generating device.

According to yet another aspect of the present invention, an image forming apparatus includes a storage device for storing image data in units of blocks, each block corresponding to a plurality of pixels; an image reading device for reading the image data stored in the storage device in block units and outputting the image data to a plurality of image forming sections each corresponding to one of respective color components; and a timing adjustment device for adjusting a timing at which, image data is read by the image reading device in units smaller than the units of the blocks in accordance with an amount of deviation of each color component.

Other objectives, features, and advantages in addition to those discussed above will become more apparent from the following detailed description of the preferred embodiments taken in conjunction with the accompanying drawings.

DETAILED DESCRIPTION OF THE PREFERRED EMBODIMENTS

Preferred embodiments of the present invention will be explained below with reference to the accompanying drawings.

First Embodiment

Figure 1:
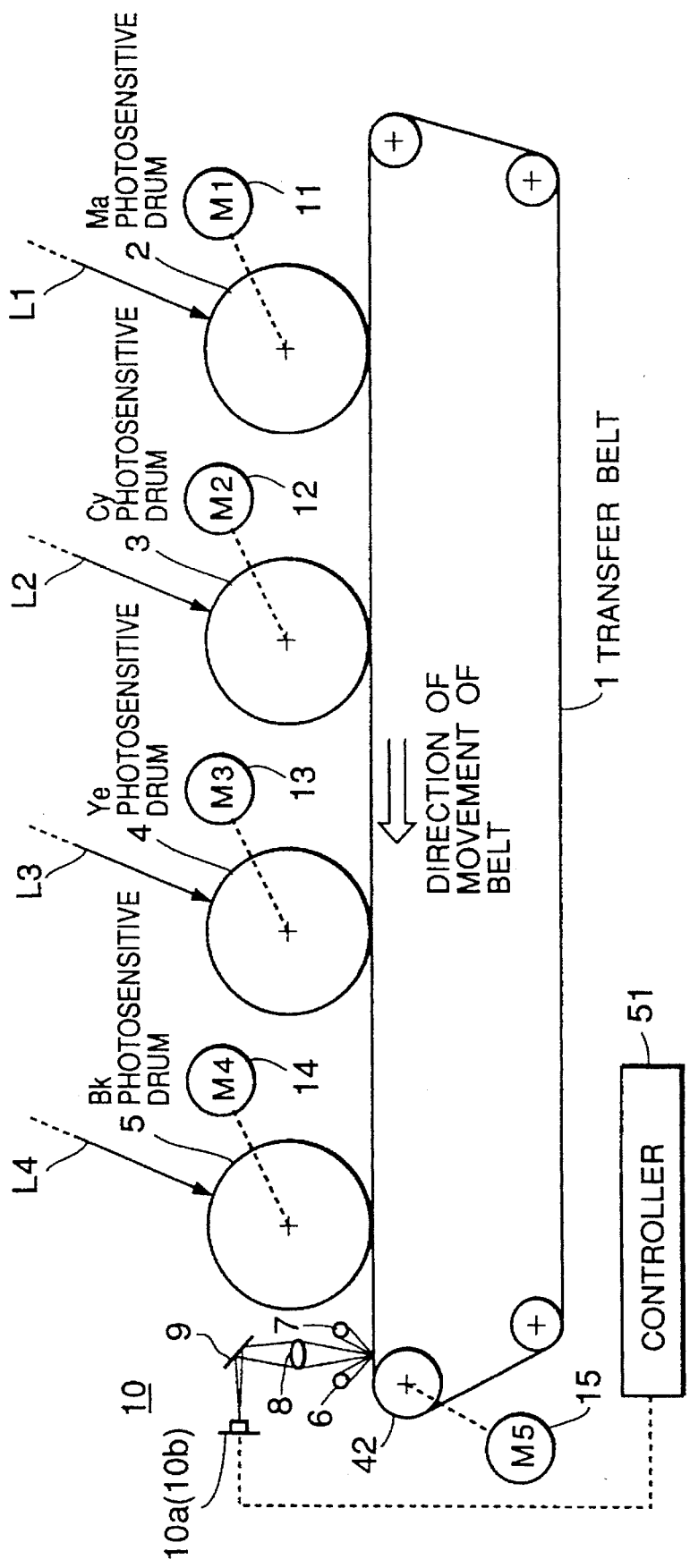
FIG. 1 is a schematic illustration of the construction of a portion of an image forming apparatus in accordance with a first embodiment of the present invention.

FIG. 1 illustrates the construction of an image forming apparatus in accordance with the first embodiment of the present invention.

Referring to FIG. 1, reference numeral 1 denotes a transfer belt which is moved at a predetermined speed or at a speed less than this predetermined speed in accordance with a different operation mode (which will be described later) in the direction indicated by the arrow in the figure as a result of the driving force of a pulse motor 15 being transmitted to a driving roller 42. Reference numerals 2 to 5 denote photosensitive drums which are disposed in order from the direction of movement of the belt (from the upstream side) in such a manner as to correspond to magenta (Ma), cyan (Cy), yellow (Ye) and black (Bk) . Electrostatic latent images formed by the scanning of light beams LB (L1), LC (L2), LY (L3) and LBk (L4) corresponding to magenta (Ma), cyan (Cy), yellow (Ye) and black (Bk) are made visible by toner stored in an unillustrated developer, and color images formed on the transfer belt 1 are transferred. Reference numerals 11 to 14 denote drum motors for rotating the photosensitive drums 2 to 5, respectively. The image forming apparatus in accordance with the present invention corresponds to means which reads out predetermined registration correction pattern data stored in an unillustrated ROM or the like. The apparatus forms a pair of pattern latent images at two predetermined positions, which are axially different from each other, of the photosensitive drums 2 to 5 by the scanning of the light beams LB (L1), LC (L2), LY (L3) and LBk (L4) modulated on the basis of this pattern data. These latent images are developed by toner of magenta (Ma), cyan (Cy), yellow (Ye) and black (Bk), and then transferred onto the transfer belt 1. In this embodiment, the pattern latent images are formed in pairs (each pair forming one set) so as to face each other at predetermined positions in the direction of the width of the transfer belt 1 at right angles to the transport direction of the transfer belt 1.

Reading means 10 is formed of illumination lamps 6 and 7, a light condensing lens 8, a reflection mirror 9, and sensors 10a and 10b comprising CCDs. The reading means 10 reads out patterns by bringing into an image reflected light obtained by illuminating a registration correction pattern (e.g., a crossed mark having a predetermined width) formed on the transfer belt 1 which is moved in accordance with the driving force of the pulse motor 15. Reference numeral 51 denotes a controller which centrally controls formation of ordinary images, formation of predetermined registration correction patterns, and reading of predetermined registration correction patterns under the control programs stored in a ROM or the like.

In the image forming apparatus constructed as described above, when a registration correction mark is formed on a transport body at a predetermined timing by pattern forming means (a patch forming section of a controller 51 in this embodiment) of respective image forming means, the reading means 10 starts to read respective registration correction marks transferred onto the transport body (the transfer belt 1). Predetermined computing operations are performed on the read data by computation operation means. The results of the operations are stored in storage means for each color, such as RAMs 603 and 604 (shown in FIG. 6, which will be described later). Correction means, such as the controller 51, analyzes the stored results of the computation, mechanically and/or electrically corrects the registration of various image stations and computes information on registration deviations from each image carrier, so that registration deviations from each of the image carriers are corrected with a high degree of accuracy.

An image forming operation will be explained first. The photosensitive drums 2 to 5 corresponding to magenta (Ma), cyan (Cy), yellow (Ye) and black (Bk) are driven to rotate by the drum motors 11 to 14, respectively, and are uniformly charged by an unillustrated charging unit. The photosensitive drums 2 to 5 are exposed, respectively, by the light beams LB (L1), LC (L2), LY (L3) and LBk (L4) which are modulated by video signals. Respective electrostatic latent images of these light beams are formed on the photosensitive drums 2 to 5, and a visible image is formed as a result of the development of electrostatic latent images by means of an unillustrated development unit.

Next, the visible images formed on the photosensitive drums 2 to 5 are transferred onto transfer paper, which is fed from an unillustrated paper feed unit and is made to electrostatically adhere onto the transfer belt 1, at a predetermined timing. The paper is transported in the direction of the arrow in the figure by the driving of the pulse motor 15, fixed and ejected.

Next, reading of registration correction pattern images will be explained. Pattern images made visible on the photosensitive drums 2 to 5 by means of a registration correction pattern image forming circuit are transferred onto the transfer belt 1 at timings shown in the timing chart of FIG. 2 and transported in the direction of the arrow in FIG. 1. The pattern images transported from the transfer belt 1 are read one after another by a CCD 10 (formed of sensors 10a and 10b) of an optical system comprising illumination lamps 6 and 7, a light condensing lens 8, and a reflection mirror 9.

Figure 3:
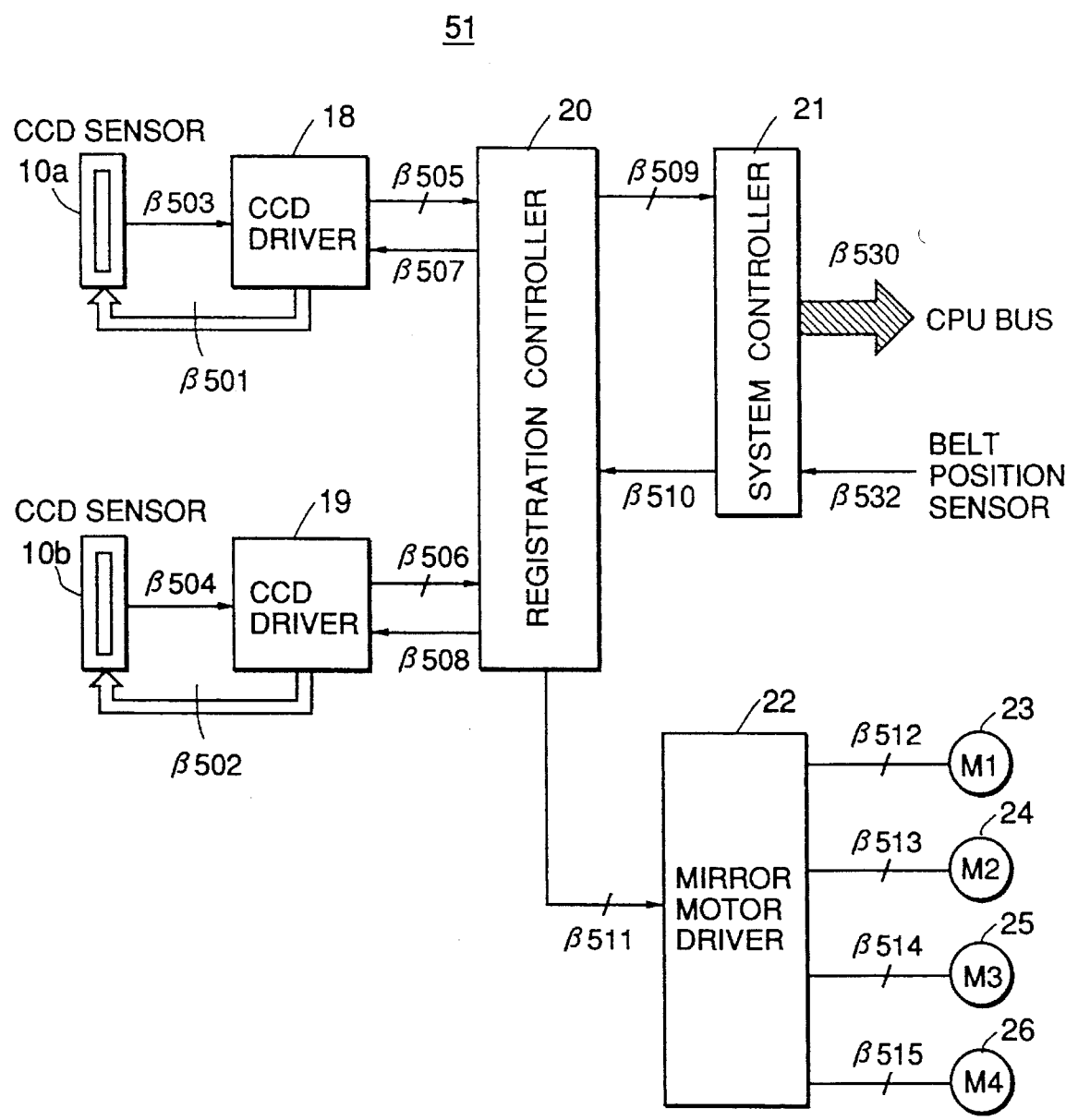
FIG. 3 is a block diagram illustrating in detail the circuitry of a controller section shown in FIG. 1.
Figure 4:
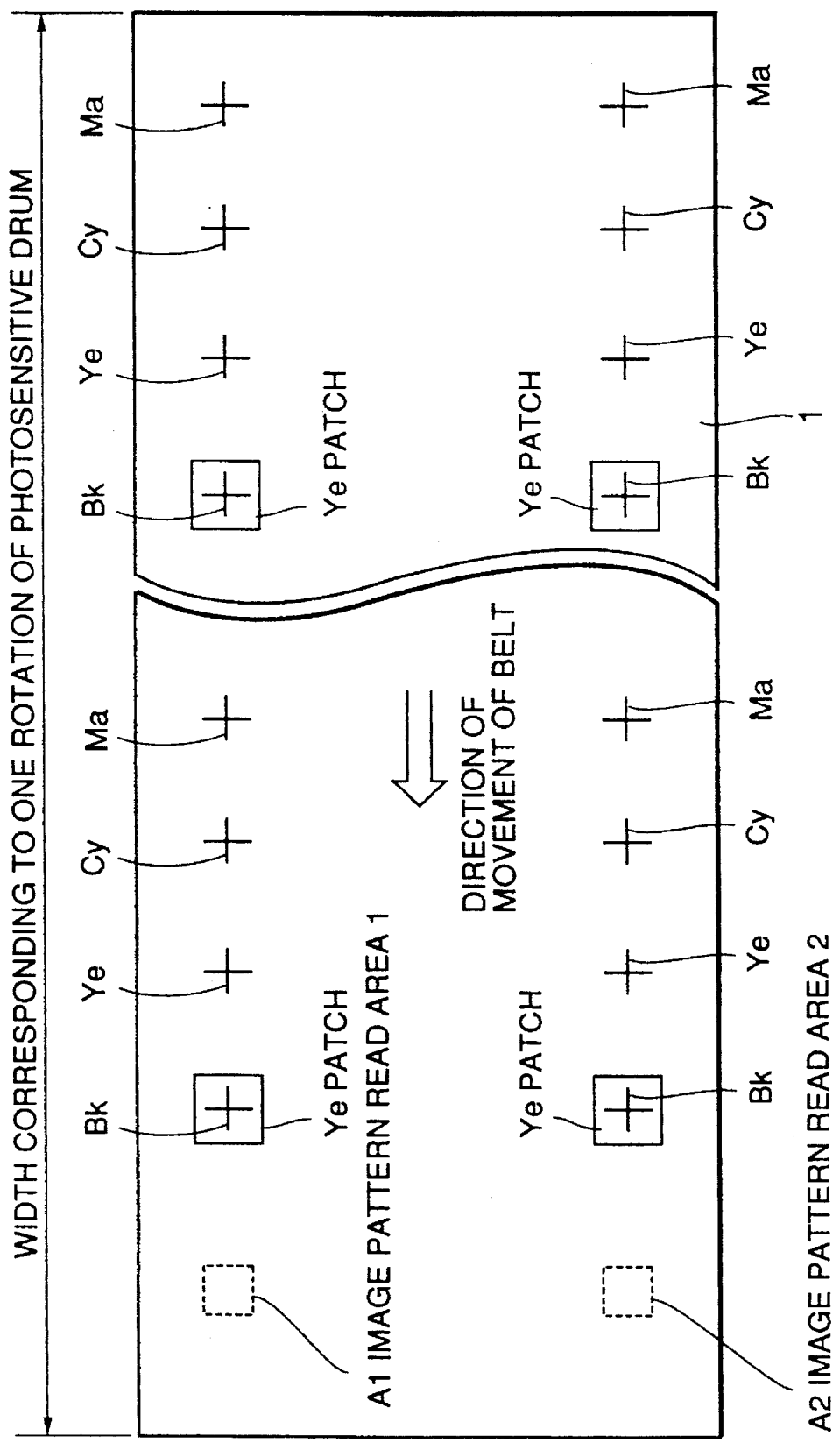
FIG. 4 is a plan view illustrating a written pattern image which is transferred to a transfer belt shown in FIG. 1.

FIG. 3 illustrates in detail the construction of the controller 51 shown in FIG. 1. The construction and operation of this controller will be explained below. The correction means in this embodiment drives driving pulse motors 23 to 26 (which will be described later) to correct registration deviation of the positions of mirrors "a" to "d" of FIG. 21 of a scanning optical system disposed for each drum and to electrically correct the scanning timing of a light beam, so that the drums are correctly registered. The pattern images for each color formed, as shown in FIG. 4, in the forward and inner part of the transfer belt 1 shown in FIG. 1 with respect to the transport direction thereof, are read by the CCD sensors 10a and 10b. Original oscillation clocks β507 and β508 from a registration controller 20 are supplied to CCD drivers 18 and 19, respectively, by which clocks β501 and β502 (e.g., transfer pulses, reset pulses, or shift pulses) required for driving the CCD sensors 10a and 10b are generated and supplied to the CCD sensors 10a and 10b, respectively. The signals of the pattern image read by the CCD sensors 10a and 10b are subjected to processing, such as amplification, DC reproduction, or A/D conversion, by means of the CCD drivers 18 and 19, and supplied to the registration controller 20. The pattern image signals for each color received by the registration controller 20 are subjected to registration correction pattern image recognition processing, and a plurality of recognition processing data are stored in a memory. The amount of registration deviation is computed, using a pattern image of a certain color as a reference, under the control of the CPU. Main-scanning and sub-scanning electrical image writing timing setting data β509 is supplied to a system controller 21. Also, pulse data β511 of pulse motors 23 to 26 for controlling the operation of the reflection mirror 9 disposed in the optical path for correcting changes in the optical path length and the optical path of record light beams is supplied to a mirror motor driver 22. The mirror motor driver 22 supplies electric current signals to the pulse motors 23 to 26 for driving reflection mirrors for each color in accordance with the pulse data β511. Thereupon, the pulse motors 23 to 26 are driven to control the positioning of mirrors "a" to "d" shown in FIG. 21. The above registration corrections are performed when a start signal β510 from the system controller 21 is supplied to the registration controller 20.

Figure 5:
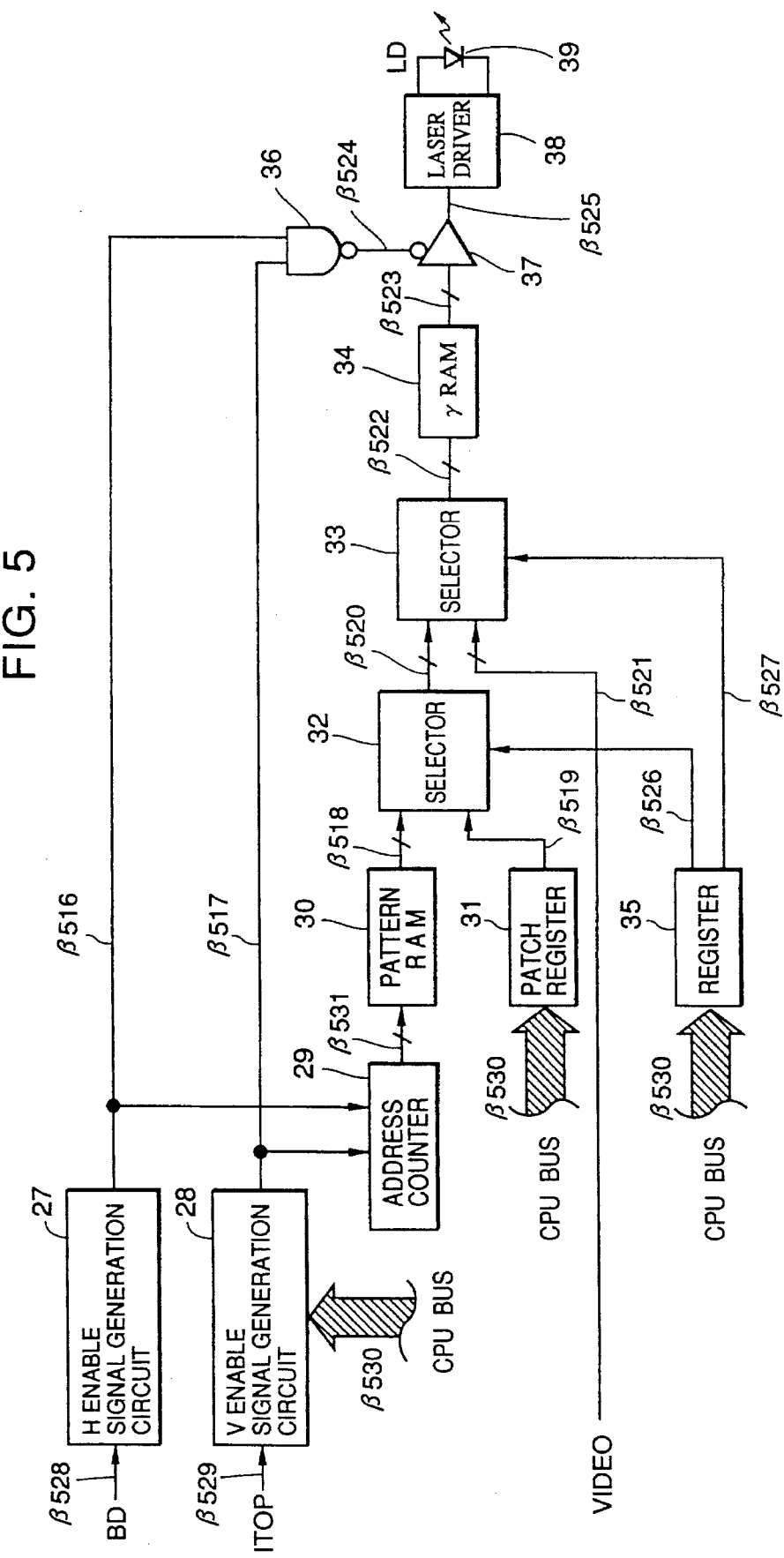
FIG. 5 is a block diagram illustrating the circuitry of a pattern forming section in the image forming apparatus shown in FIG. 1.

FIG. 5 illustrates the construction of the pattern forming section of the image forming apparatus shown in FIG. 1. The construction and operation of the pattern forming section will be explained below. A beam detect signal β528 which is obtained by the scanning of the light beam in an area other than record areas and which serves as a synchronization signal in the main scanning direction is input to a main-scanning enable signal generation section 27 (H enable signal generation circuit) where a registration correction image pattern signal H (horizontal) enable signal β516 is formed.

Figure 2:
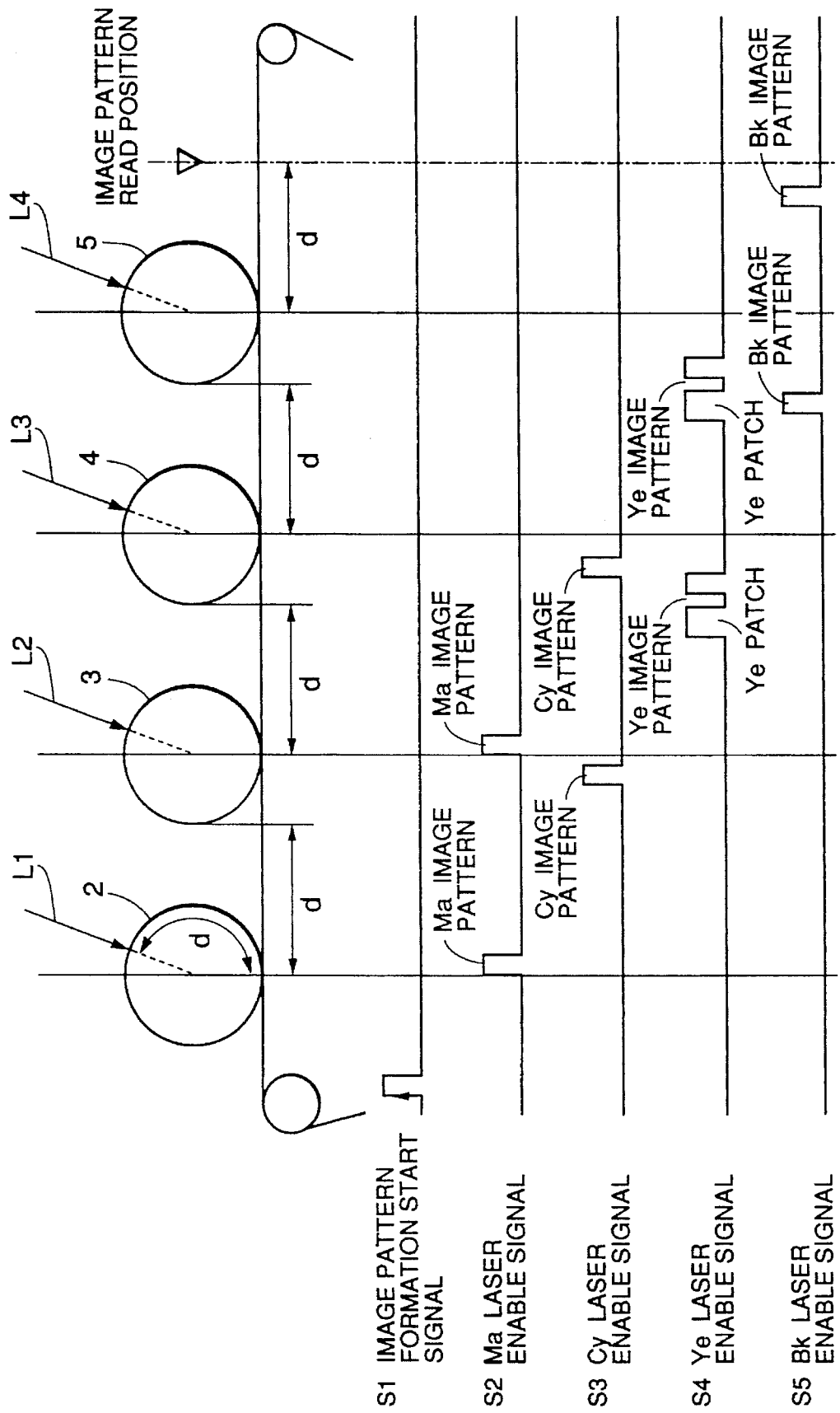
FIG. 2 is a timing chart illustrating the timings of pattern image writing in the image forming apparatus shown in FIG. 1.

Also, a start signal (ITOP) β529 for forming a registration correction image pattern is input to a sub-scanning enable signal generation circuit 28 (V enable signal generation circuit) where a V (vertical) enable signal β517 for image pattern signals of each color is generated. The horizontal enable signal β516 and the vertical enable signal β517 are supplied to an address counter 29 where an address signal β531 of a RAM 30 for the next registration correction image pattern is generated. An image pattern β518 ("a crossed pattern" in this embodiment) is output from the image pattern RAM 30 in response to the address signal β531. Patch data formed beneath the registration correction image pattern via a CPU bus β530 from the system controller 21 is stored in a patch register 31. The patch data signal β519 and the image pattern signal β518 are input to a selector 32, and a selection signal β526 is input thereto so that the image pattern signal β518 is always output as regards magenta (Ma) and cyan (Cy). As regards yellow (Ye) and black (Bk), a signal β520 by which image pattern data and patch data are switched to each other at a predetermined timing in accordance with the timing chart shown in FIG. 2 is input to a register 35 via the CPU bus β530, and then input to a selector 33 to which a video signal β521 is input. This makes it impossible to read registration pattern images when carbon black type toner is used as black toner because carbon black absorbs light in the reflection optical system. For this reason, a solid pattern (patch) is formed on the transfer belt 1 earlier by a predetermined time by using toner of any one of the other colors (magenta, cyan and yellow; yellow toner is used in this embodiment) which reflects light when a registration correction image pattern for yellow is formed, and a registration correction image pattern for black is formed on the patch formed by the above-mentioned yellow toner.

Therefore, in the mode in which image patterns and patches are formed, an image pattern and a patch are selected on the basis of a selection signal β527. Selected image information β522 is output to a γRAM 34. Image information β523 gamma-converted in the γRAM 34 is output to a laser driver 38 as a video signal β525 via a gate circuit 37. An image signal β524 is input to the laser driver 38 via a NAND gate 36. A semiconductor laser 39 is on/off modulated on the basis of the video signal β525 input to the laser driver 38. A light beam from the semiconductor laser 39 enables latent images to be formed on the photosensitive drums 2 to 5 via an unillustrated optical scanning system (a polygon mirror, a fΘ lens and the like).

Although in this embodiment a pattern generation circuit is disposed for each color, the pattern RAM 3 or the like can also be used for various colors.

Figure 6:
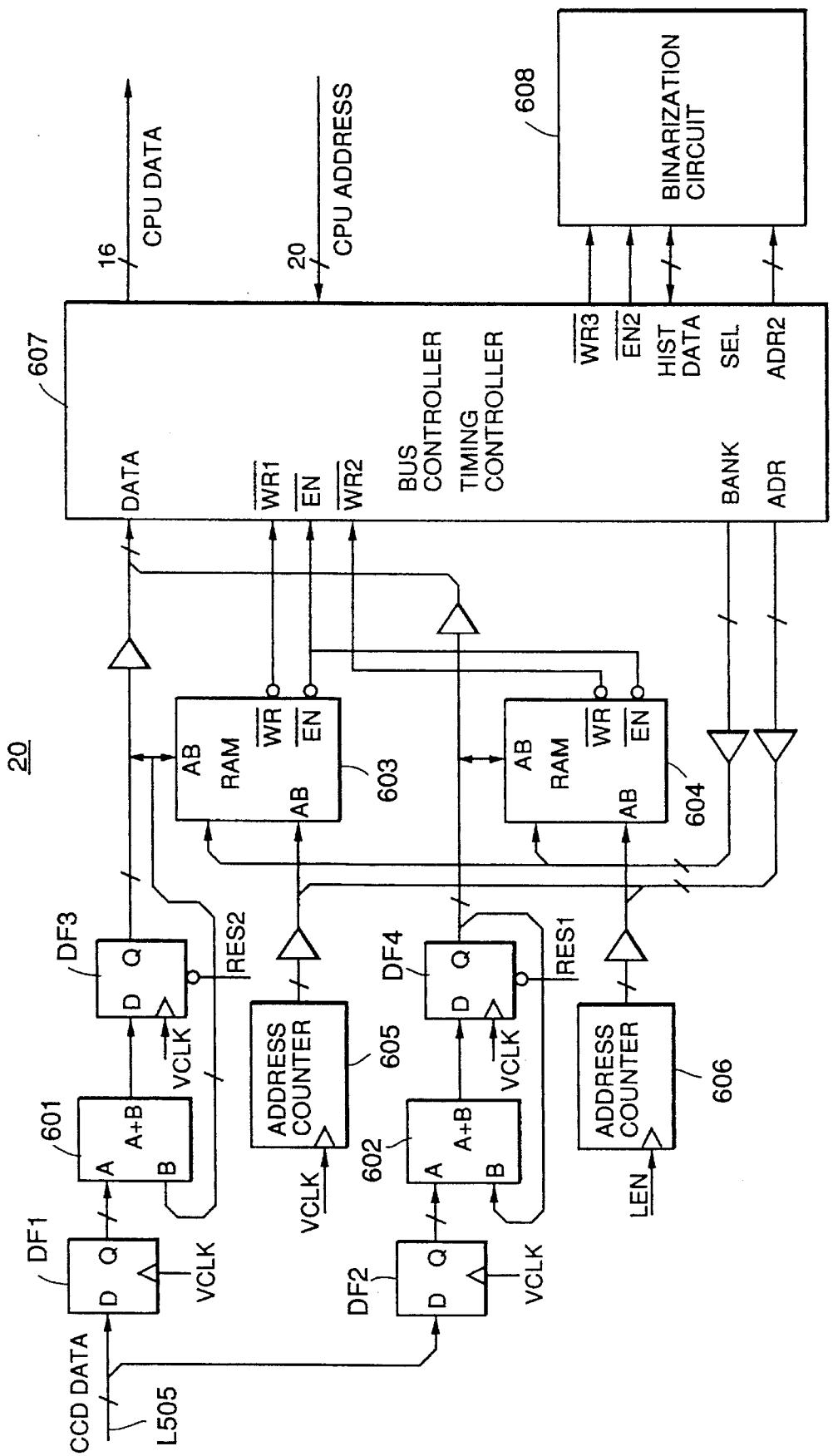
FIG. 6 is a block diagram illustrating the circuitry of a portion of a registration controller shown in FIG. 3.
Figure 7:
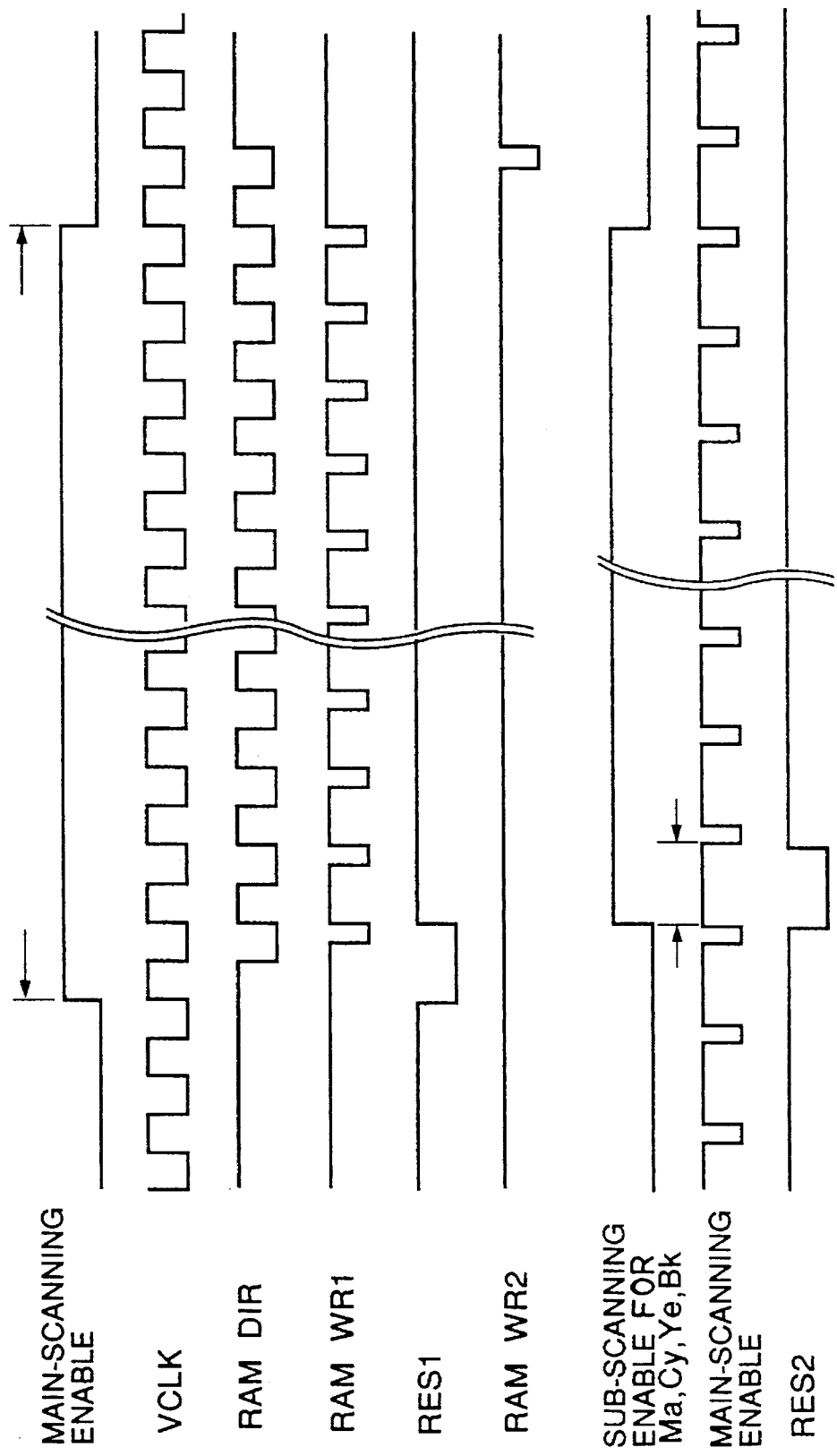
FIG. 7 is a timing chart illustrating the operations of the circuitry shown in FIG. 6.

An operation for computing positions and shapes of patterns for each color will be explained with reference to FIGS. 6 and 7. FIG. 6 illustrates the construction of a portion of the registration controller 20 shown in FIG. 3. In FIG. 6, reference letters DF1 and DF4 denote D type flip-flops; reference numerals 601 and 602 denote adders which calculate the addition of inputs A and B; reference numerals 603 and 604 denote RAMs for storing density histograms of patterns for each color in the sub-scanning and main-scanning directions, respectively, at a timing in accordance with the timing chart shown in FIG. 7; reference numeral 607 denotes a bus controller which outputs various timing signals and a bank selection signal BANKSEL; and reference numeral 608 denotes a binarization circuit for binarizing density addition histogram data of registration correction image marks.

In this embodiment, a density histogram is created for each pixel of each line with respect to the main scanning and sub-scanning of pattern data which is read to compute positions and shapes of patterns for each color. The shape of a pattern is recognized on the basis of the created histogram data.

Initially, to create a density histogram in the main-scanning direction, pattern data of one scanning line which is output, for example, from the CCD sensor 10a, is initialized in response to a reset signal RES1. Thereafter, data is added for one line by means of an adder 602 and determined. This one line of data is written in a RAM 604 in synchronization with a writing signal RAMWR2 in accordance with the address determined by an address counter 606 in accordance with a main-scanning enable signal LEN output at the timing shown in FIG. 7. The memory is enabled while the sub-scanning enable signal is being output.

Figure 8:
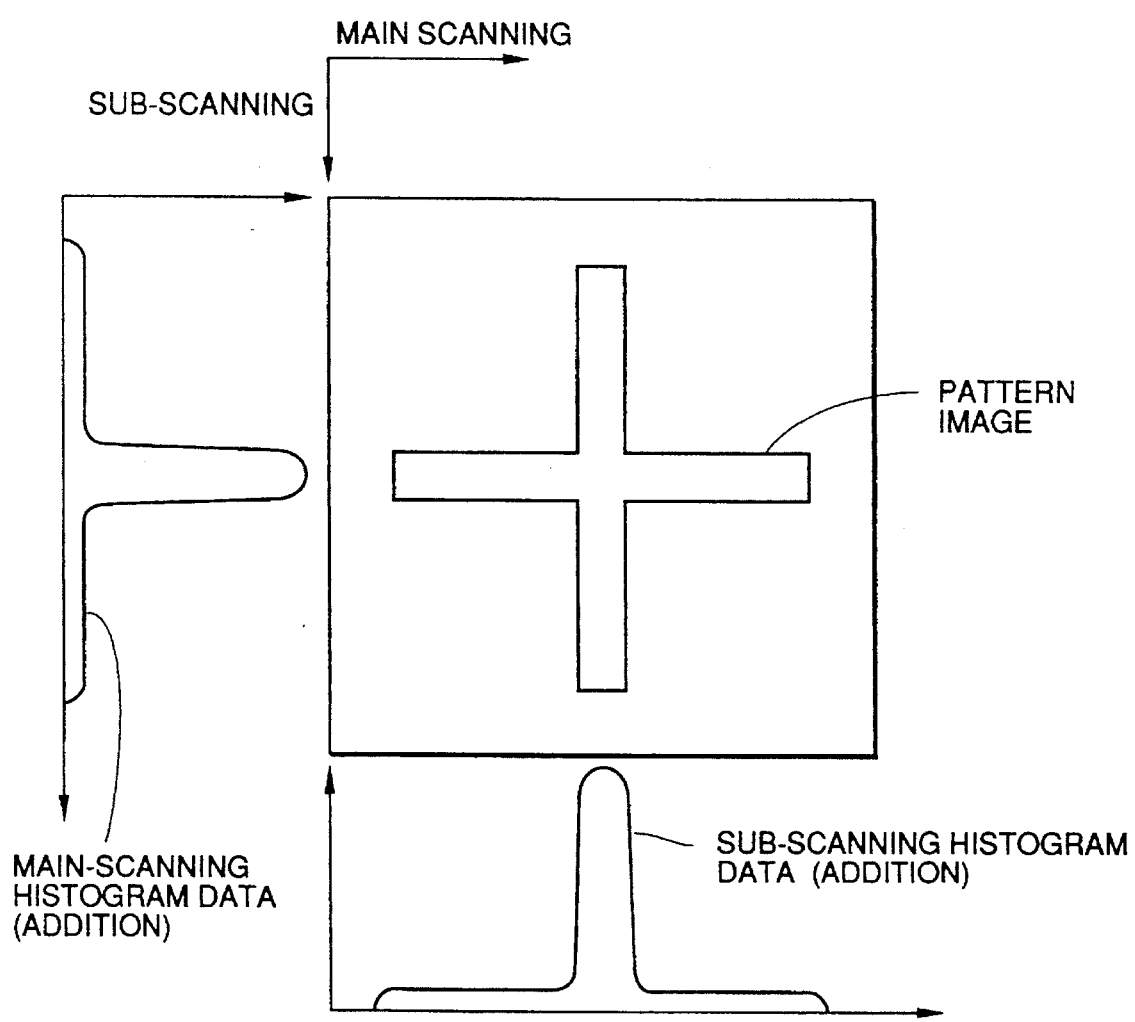
FIG. 8 shows a histogram based on a pattern image transferred to the transfer belt shown in FIG. 1.

On the other hand, to create a density histogram in the main-scanning direction, after the density histogram is cleared in response to a reset signal RES2, one line of main-scanning pattern data is stored in the RAM 603. Thereafter, a read/modify/write operation is repeatedly performed for each pixel in response to a writing signal RAMWR1 and data direction switching signal RAMDIR. The histogram data of each sub-scanning line is stored in the RAM 603 for each pixel. As a result, main-scanning and sub-scanning histogram data for pattern images shown in FIG. 8 are stored in the RAMs 603 and 604 for each color. In this embodiment, the memory space is used separately by selecting banks for each color and banks of various sets on the basis of the bank selection signal BANKSEL and by sending the selected bank to the upper order of the RAM.

Figure 9:
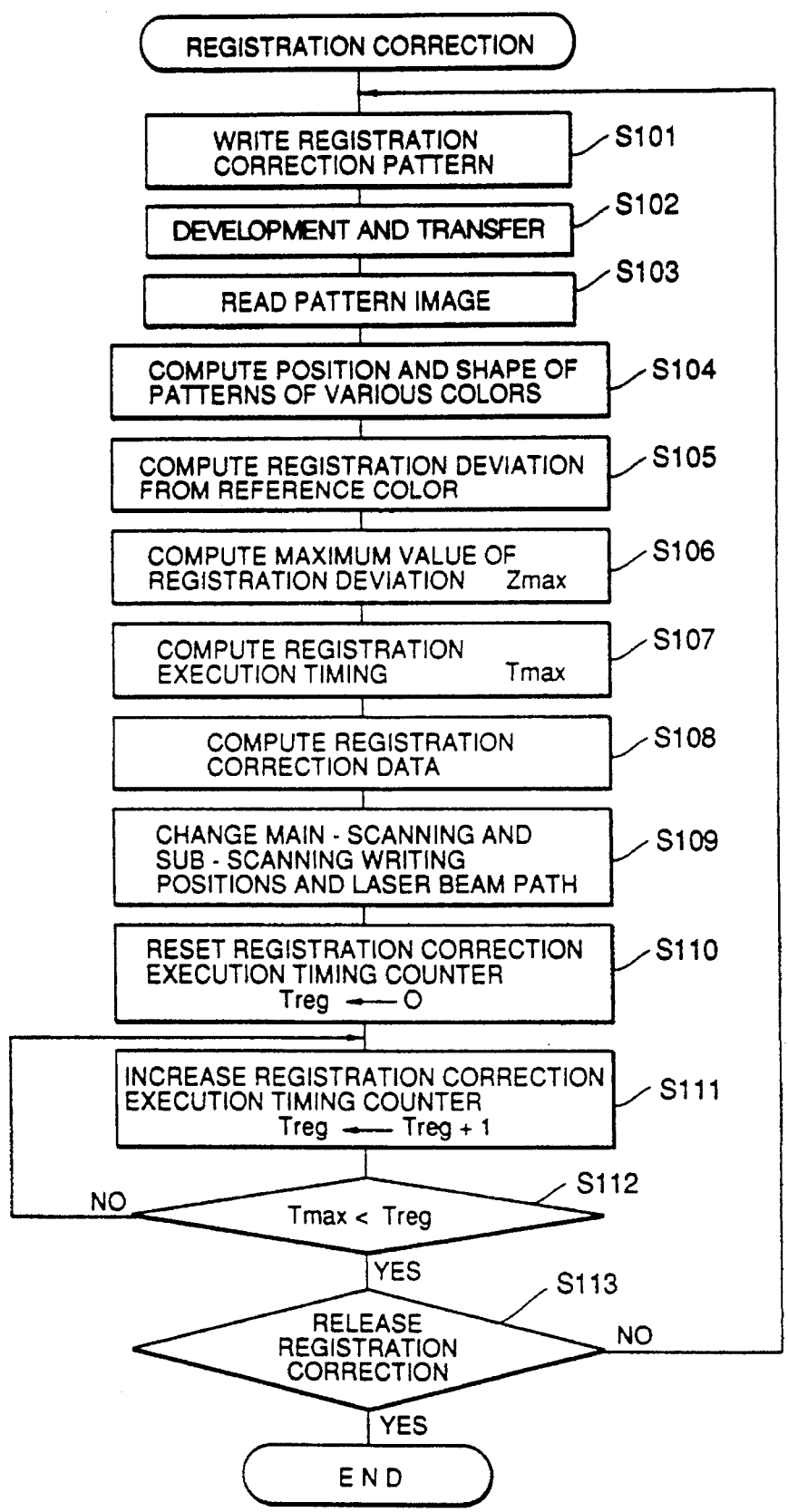
FIG. 9 is a flowchart showing the sequence of registration correction process in accordance with the first embodiment of the present invention.

FIG. 9 illustrates an example of a sequence of registration correction operations in the image forming apparatus in accordance with the first embodiment of the present invention. S101 to S113 each indicate steps of the operation.

Initially, pattern images are written on the photosensitive drums 2 to 5 corresponding to respective colors by means of the pattern forming section shown in FIG. 5 (S101). Electrostatic latent images on the photosensitive members are developed by toner, and transferred onto the transfer belt 1 (S102). Next, the developed pattern images are transported in turn to pattern image read positions (image pattern read areas A1 and A2 indicated by the dashed line frame in FIG. 4) and are read by a pattern image reading section comprising CCD sensors 10a and 10b shown in FIG. 3 (S103).

Digital signals β505 and β506 which are read and processed by the CCD sensors 10a and 10b are input to the registration controller 20. The registration controller 20 computes the positions and shapes of patterns for each color on the basis of the histogram data in the main-scanning and sub-scanning directions created in response to the digital signals (S104). Further, this computed data is sent out to the system controller 21 shown in FIG. 3 via the bus controller 607. The system controller 21 sends out this data to an unillustrated CPU via the CPU bus signal β530, and the CPU computes the amount of registration deviation of each color with respect to a reference color on the basis of the positions and shapes of the patterns of the various colors (S105). The amount of deviation $Z_{max}$ of the color which deviates most is computed (S106). A timing $T_{max}$ at which the next registration correction operation in correspondence with the maximum amount of deviation $Z_{max}$ is performed is computed (S107). The larger the amount of deviation, the smaller the value of $T_{max}$, and the smaller the amount of deviation, the larger the $T_{max}$ becomes. That is, since $T_{max} \propto 1/Z_{max}$, a proportional coefficient "a" satisfying $T_{max} = a/Z_{max}$ can be set at an arbitrary constant. Next, registration correction data is computed by the unillustrated CPU on the basis of the amount of deviations of each color computed in the computation operations in step S105 (S108). The main-scanning and sub-scanning writing positions and the optical path of the laser are changed on the basis of the correction data (S109).

After a series of registration corrections are performed as described above, the timing at which a series of registration corrections for the next time will occur is determined. Initially, a registration correction execution timing counter (not shown) is initialized ($T_{reg} \leftarrow 0$) (S110). This counter is increased at fixed interrupt intervals by the unillustrated CPU (S111). The counter value $T_{reg}$ is compared with the registration execution timing $T_{max}$ previously determined in step S107 (S112) to determine whether or not the relation $T_{max} < T_{reg}$ is satisfied, that is, whether the $T_{reg}$ has been increased to reach the timing $T_{max}$ at which registration correction can be performed. After the timing at which registration correction can be performed is reached, a check is made to determine whether the registration correction has been released (S113). After it has been confirmed that the registration correction has not been released, the process returns to step S101, and the above-described series of operations, such as writing and reading of patterns, computation of positions and shapes, computation of registration deviations,—and so forth, up through changing of main-scanning and sub-scanning writing positions and the optical path, are performed.

Because of the performing of such sequential operations, when the amount of registration deviation varies greatly, for example, when the temperature of a machine is increased when the power supply is turned on, the above-described series of correction operations are performed frequently. When the amount of registration deviation is small, that is, during a normal operation in which the temperature or the like is stable, the time period for performing the correction operations can be increased.

First Modification of the First Embodiment

Figure 10:
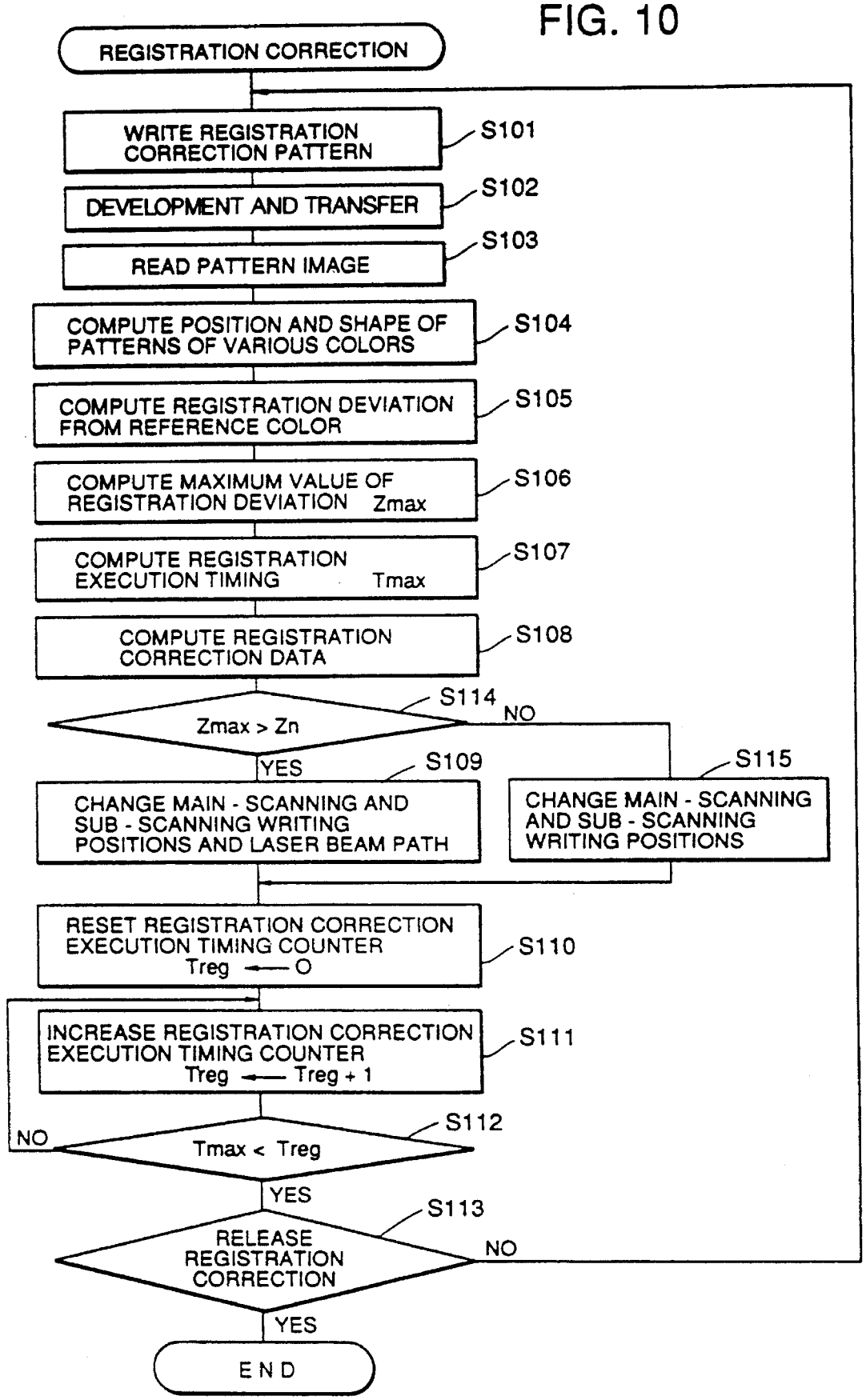
FIG. 10 is a flowchart showing the sequence of registration correction process in accordance with a modification of the first embodiment of the present invention.

The flowchart of FIG. 10 illustrates a modification of the first embodiment of the present invention of FIG. 9. In this embodiment, writing and reading of patterns, computation of positions and shapes, computation of the amount of registration deviations, computation of values $Z_{max}$ and $T_{max}$, and computation of registration correction data (S101 to S108) are performed in the same way as in the first embodiment shown in FIG. 9. When $Z_{max} < Z_n$, that is, when the amount of registration deviation $Z_{max}$ is smaller than a fixed amount $Z_n$ ($Z_n$ can be set at any value and usually is sufficiently smaller than $Z_{max}$) (S114), only main-scanning and sub-scanning writing positions are changed (S115). When the amount $Z_{max}$ is larger than the fixed amount $Z_n$, both the writing positions and the laser optical path are changed (S109).

This means that when the amount of registration deviation $Z_{max}$ is small, deviations such as inclination or magnification of an image, are usually small. Most deviations are parallel to the main-scanning and sub-scanning writing positions. Taking note of this fact, when $Z_{max} \leq Z_n$ in this embodiment, only main-scanning and sub-scanning writing positions are changed. Use of such a sequence of operations has an advantage in that the time for performing a series of registration correction operations can be shortened because the optical path is not changed by the pulse motor when the amount of registration deviation is small.

Second Modification of the First Embodiment

Figure 11:
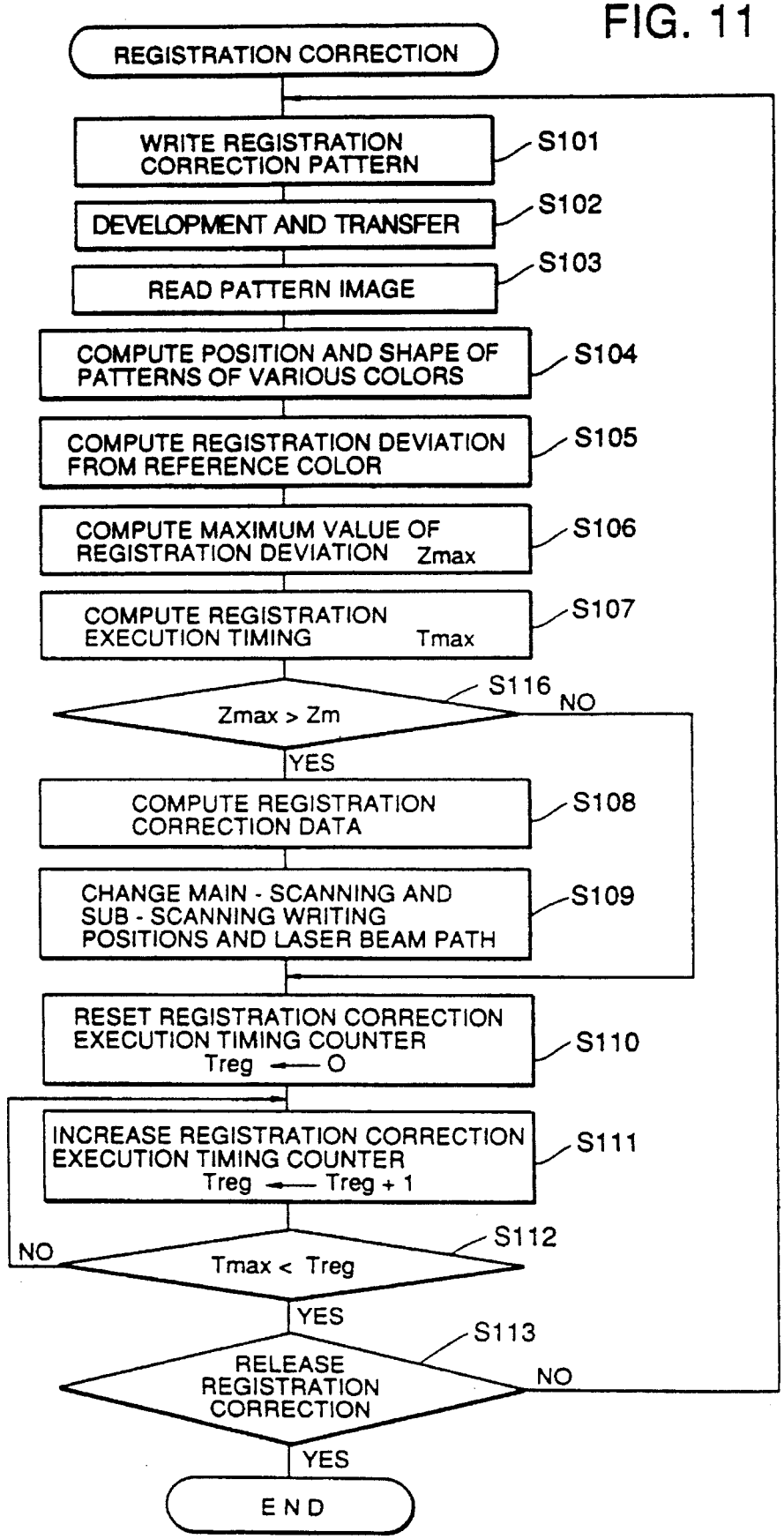
FIG. 11 is a flowchart showing the sequence of registration correction process in accordance with another modification of the first embodiment of the present invention.

The flowchart of FIG. 11 illustrates another modification of the first embodiment of the present invention of FIG. 9. This embodiment is similar to the first embodiment of FIG. 9 in the steps of writing and reading of patterns, computation of positions and shapes, computation of the amount of deviations, and computations of $Z_{max}$ and $T_{max}$ (S101 to S107). When $Z_{max} \leq Z_n$, that is, when there is little registration deviation (S116), the process proceeds from step S116 to step S110 without performing computation of registration correction data (S108), or registration correction (S109), in which step S110 the timing counter is reset. At this time, it is necessary for the fixed value $Z_m$ to be sufficiently smaller than $Z_{max}$, i.e., to be a value closer to zero, in which there is little registration deviation. Use of the sequence of operations described above makes it possible to perform a series of registration deviation correction operations more speedily because only reading of patterns, computation of the amount of deviation and computation of execution timings are performed when there is little registration deviation.

Second Embodiment

Figure 12:
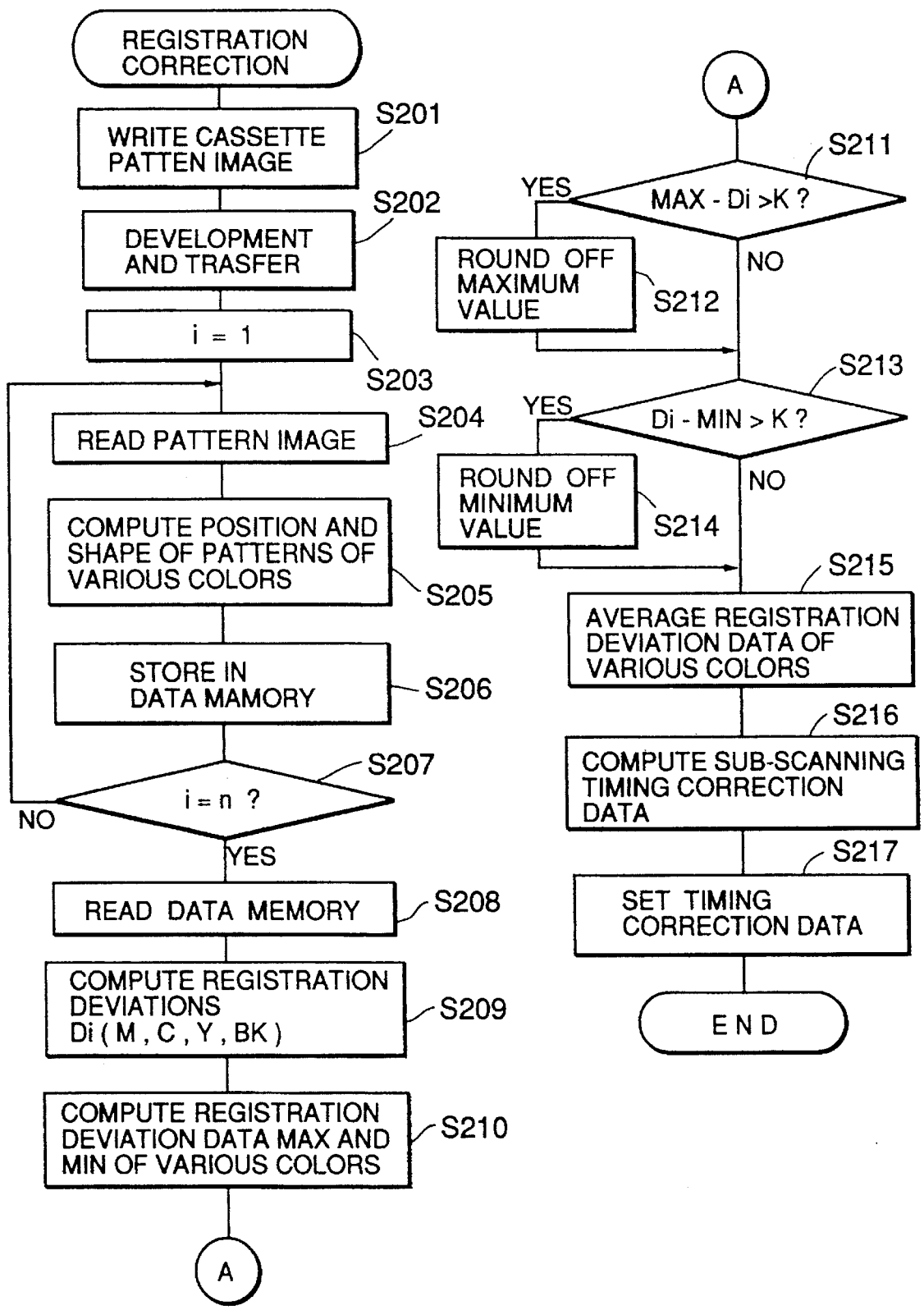
FIG. 12 is a flowchart showing the sequence of registration correction process of an image forming apparatus in accordance with a second embodiment of the present invention.

FIG. 12 is a flowchart showing the sequence of the registration correcting process in accordance with the second embodiment of the present invention. S201 to S217 each indicate steps of the operation. The circuitry and the like are the same as in the first embodiment shown in FIGS. 1 to 8.

Initially, pattern images for n sets which can be formed while the photosensitive drum is rotated one time, are written on the photosensitive drums 2 to 5 by the pattern forming section shown in FIG. 5 (S201). The electrostatic latent images on the photosensitive drums are developed by toner and transferred onto the transfer belt 1 (S202). Next, parameter i is set at "1" (S203). A pattern image of the first set of each color transported in turn to pattern image read positions (image pattern read areas A1 and A2 indicated by the dashed line frame in FIG. 4) are read by the pattern image reading section comprising CCD sensors 10a and 10b shown in FIG. 3 (S204). Digital signals β505 and β506 which are read and processed by the CCD sensors 10a and 10b are input to the registration controller 20. The registration controller 20 computes the positions and shapes of patterns for each color on the basis of the histogram data in the main-scanning and sub-scanning directions created in response to the digital signals (S205). These position and shape data are stored in a temporary memory (RAMs 603 and 604 in this embodiment) (S206). Next, a check is made to determine whether data on positions and shapes of patterns for each color for n sets has been stored in the memory (S207). If it has not been stored, steps S204 to S206 are performed again; if it has been stored, the data are read on positions and shapes of patterns for each color in the main-and sub-scanning directions for n sets, which are stored in the RAMs 603 and 604 (S208). These data are sent out to the system controller 21 shown in FIG. 3 via the bus controller 607. Further, the system controller 21 sends out the data to the unillustrated CPU via the CPU bus signal β530. On the basis of the data, the CPU computes registration deviation data Di (M, C, Y, and Bk) (S209).

Next, the maximum value MAX and the minimum value MIN of the N registration deviation data for each color are computed (S210). The difference between the maximum value MAX and the registration deviation data Di is calculated to eliminate image pattern read errors, and a check is made whether the difference is larger than a predetermined value k in all N-1 registration deviation data (S211). If it is determined that the difference is larger than the predetermined value k in all N-1 registration deviation data, the maximum value MAX is regarded to be an image pattern read error, and this maximum value MAX is discarded from the registration deviation data (S212). If, however, the difference between the maximum value MAX and the registration deviation data Di is smaller than the predetermined value k in any of the N-1 registration deviation data, the maximum value MAX is left unchanged.

Next, the difference between the minimum value MIN and the other registration deviation data Di is calculated to eliminate image pattern read errors. A check is made to determine whether the difference is larger than the predetermined value k in all N-1 (N-2 when the maximum value MAX is discarded) registration deviation data (S213). If it is determined that the difference is larger than the predetermined value k in all N-2 or N-1 registration deviation data, the maximum value MAX is regarded to be an image pattern read error, and this maximum value MIN is discarded from the registration deviation data (S214). If, however, the difference between the maximum value MAX and the registration deviation data Di is smaller than the predetermined value k in any of the N-2 or N-1 registration deviation data, the maximum value MIN is left unchanged.

Next, registration deviation data Di of which the maximum value MAX and the minimum value MIN are discarded or stored from among the N registration deviation data for each color is averaged (S215). In step S216, sub-scanning timing correction data for image signals for each color is computed. In step S217, the computed correction data are set together with the main-scanning timing correction data. Next, main-scanning and sub-scanning image writing timings are set, thus terminating the registration correction mode.

Next, an explanation will be given in more detail about reading of the data memory shown in step S208 of FIG. 12 and computation of registration deviation data shown in step S209.

Figure 13:
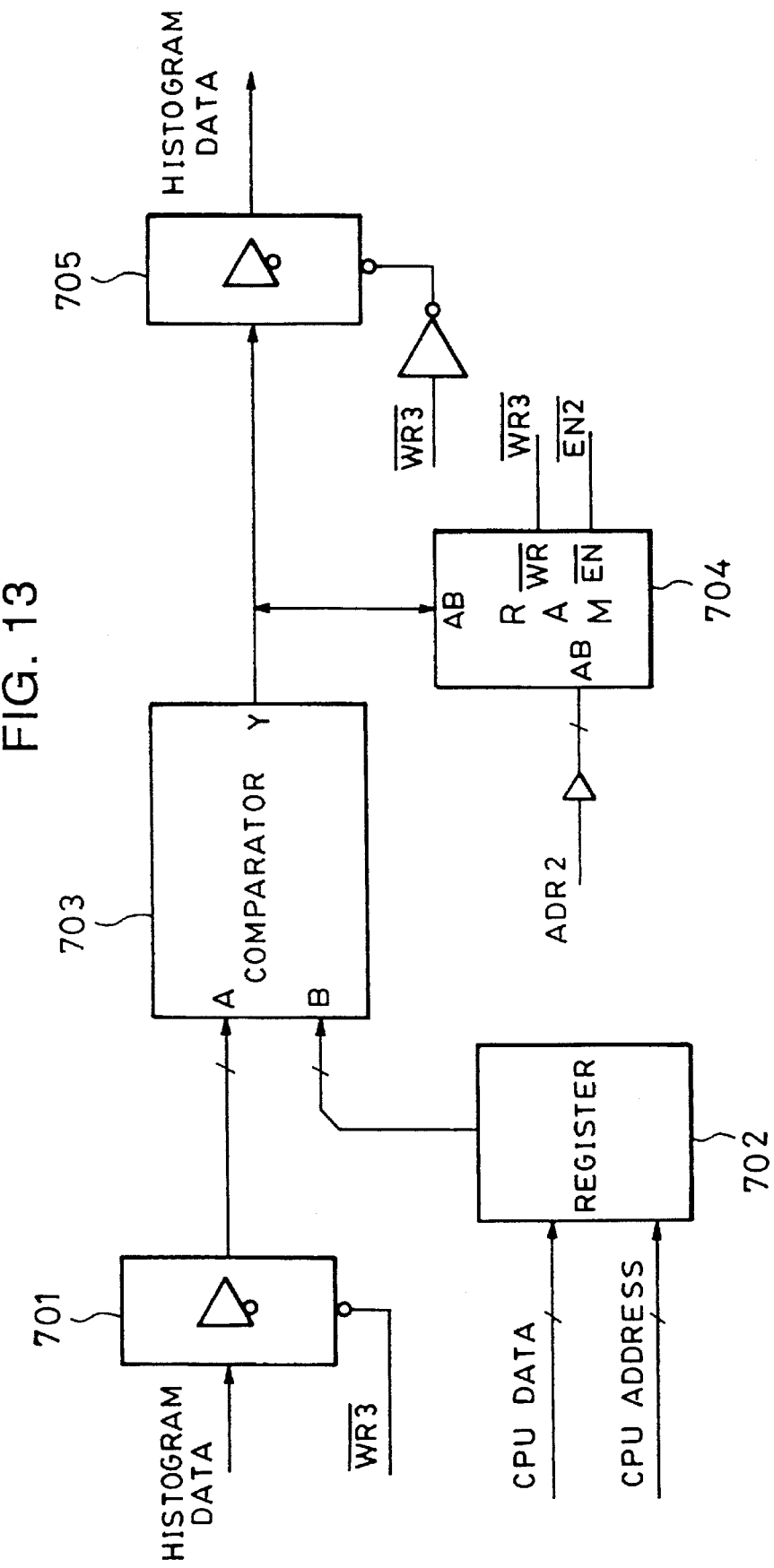
FIG. 13 is a block diagram illustrating the circuitry of a portion of a binarization circuit shown in FIG. 6.

Histogram data stored in the RAMs 603 and 604 shown in FIG. 6, which is read under the control of the bus controller 607, is sent out to the binarization circuit 608. The construction of the binarization circuit 608 is shown in FIG. 13. Referring to FIG. 13, reference numeral 701 denotes a bus selector which is active so as to permit histogram data to pass therethrough when the histogram data is read and sent out to the binarization circuit 608; reference numeral 702 denotes a register for storing binarization levels (CPU data) set by the unillustrated CPU; and reference numeral 703 denotes a comparator for comparing histogram data (A) from the bus selector 701 with a register value (B) from the register 702 and for generating a binary signal which becomes "1" when the histogram data is larger.

Figure 14A:
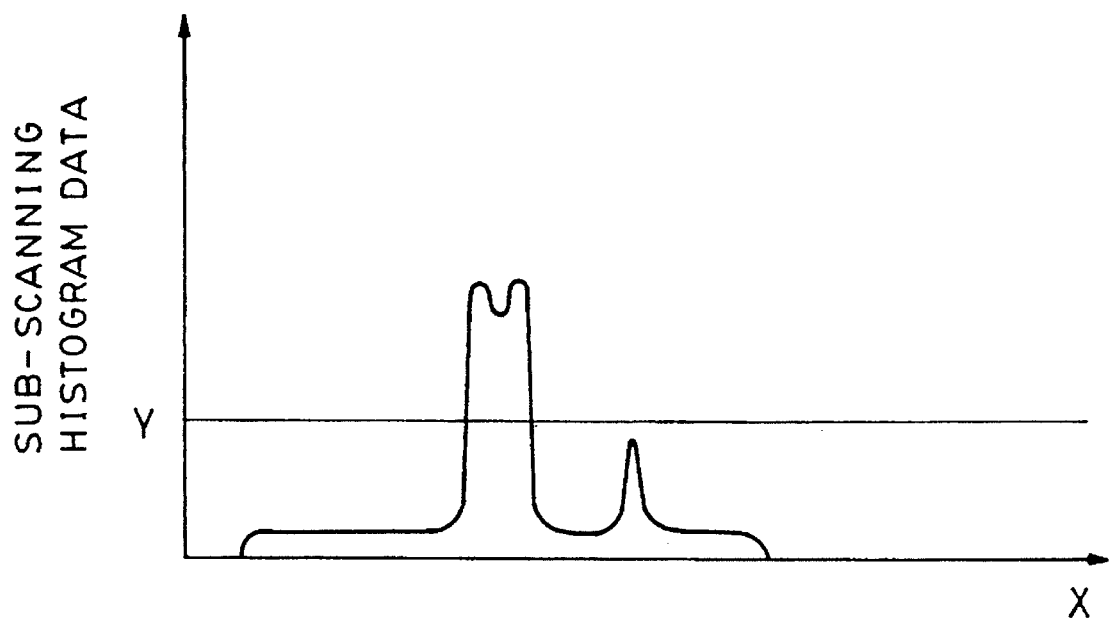
FIGS. 14(A) and 14(B) are graphs showing histogram data and data obtained by binarizing the histogram data.
Figure 14B:
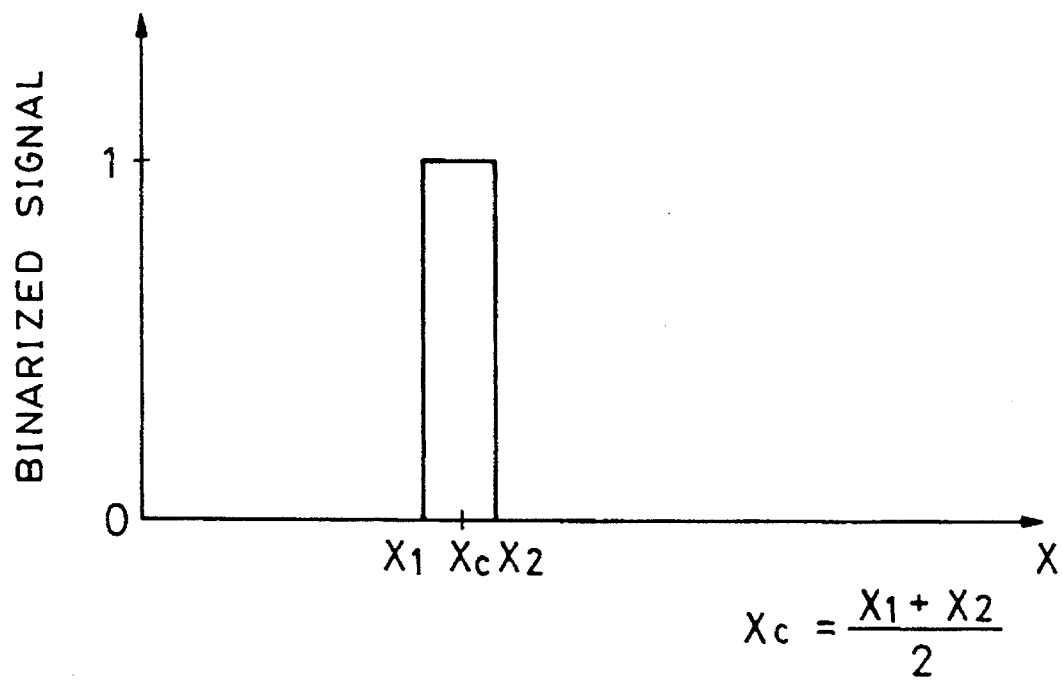

Binary signals obtained by binarizing the histogram data are stored in a RAM 704. At this time, since address signals and various control signals are controlled by the bus controller 607 shown in FIG. 6, data is uniquely set in the RAM 704. The binarized data stored in the RAM 704 is read by the unillustrated CPU. The central position of the data, i.e., the central position of the patterns for each color, is computed. For example, as shown in FIG. 14(A), when there is histogram data in a condition in which part of the image is lost on the transfer belt 1 during transfer and the image is made irregular, a threshold value Y is set by the unillustrated CPU. When the histogram data is binarized, binarized information shown in FIG. 14(B) can be obtained.

Figure 15:
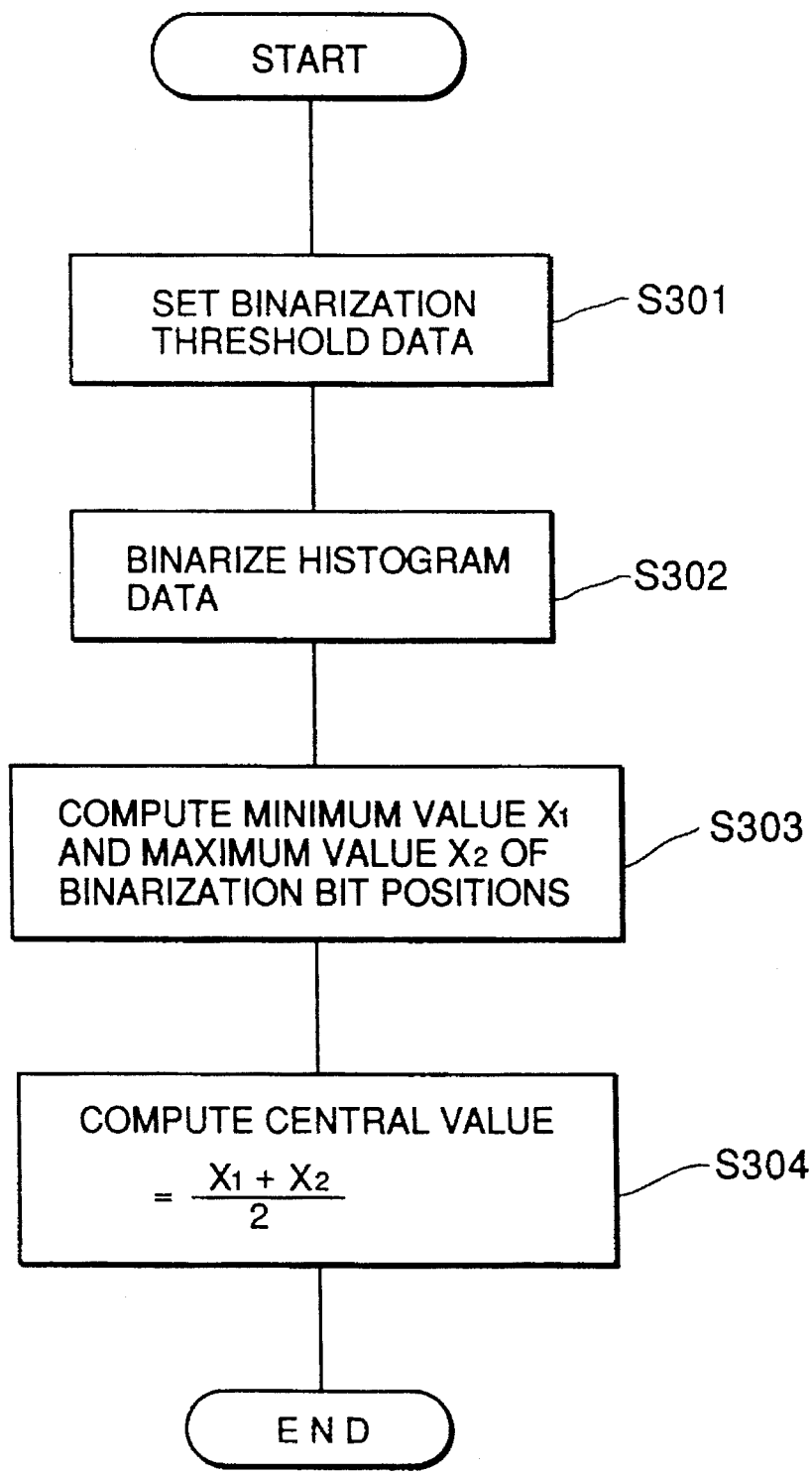
FIG. 15 is a flowchart showing the procedure for computing the center of a registration correction mark in the image forming apparatus in accordance with the second embodiment of the present invention.

The flowchart of FIG. 15 shows the algorithm for computing a central position, which is executed by the unillustrated CPU. The threshold value Y is set by the unillustrated CPU (S301). The histogram data is binarized by the binarization circuit 608, and the binarized information is stored in the RAM 704 (S302). Next, the binarized information is read out from the RAM 704 by the unillustrated CPU. Points X1 and X2, which are the minimum and maximum values, respectively, and are change points of the binarized signal information in the direction of the position X, are computed (S303). A central position $X_c$ is computed by calculating the average of X1 and X2 (S304).

Since the central position is computed as described above, binarized signals shown in FIG. 14(B) can be obtained by the above-described binarization operation in the case of histogram data indicating that part of the image is lost on the transfer belt 1 during transfer and the image is made irregular, that is, the histogram data shown in FIG. 14(B). As a result, the central position of the registration correction image mark can be accurately determined according to the algorithm shown in FIG. 15.

First Modification of the Second Embodiment

In the above-described second embodiment of the present invention, an addition histogram is created and binarized even when data is lost during transfer because of a change in the process conditions, so that change points thereof are detected and the central value is determined based on the change points. In contrast, in the embodiment described below, it is possible to compute the central value even when a registration correction mark is formed in a portion where a density irregularity which is higher than a binarization threshold value occurs on the transfer belt 1.

Figure 16:
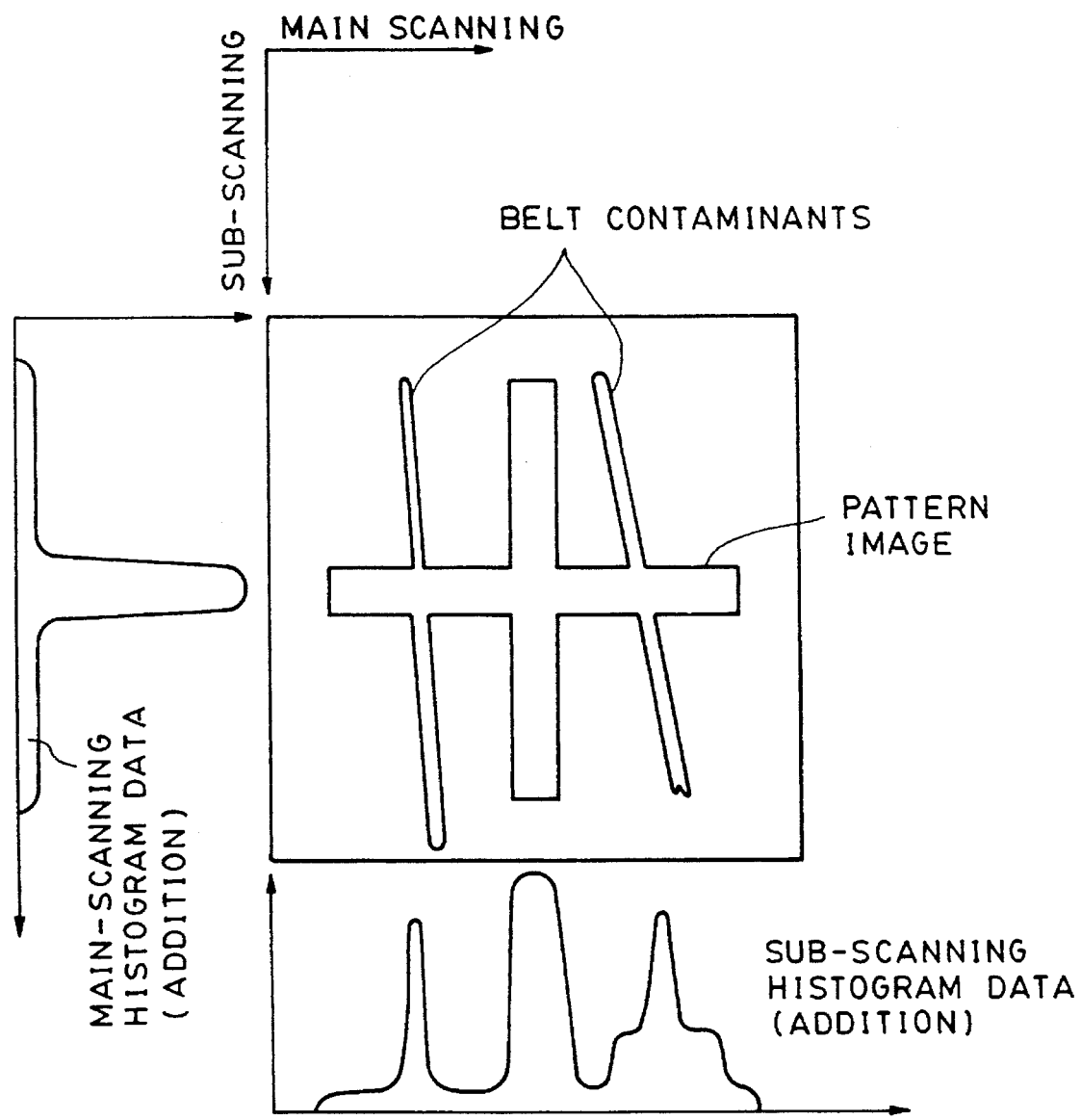
FIG. 16 is an illustration of a pattern image when a registration correction mark is formed on contaminants on a belt and the histogram data thereof.
Figure 17A:
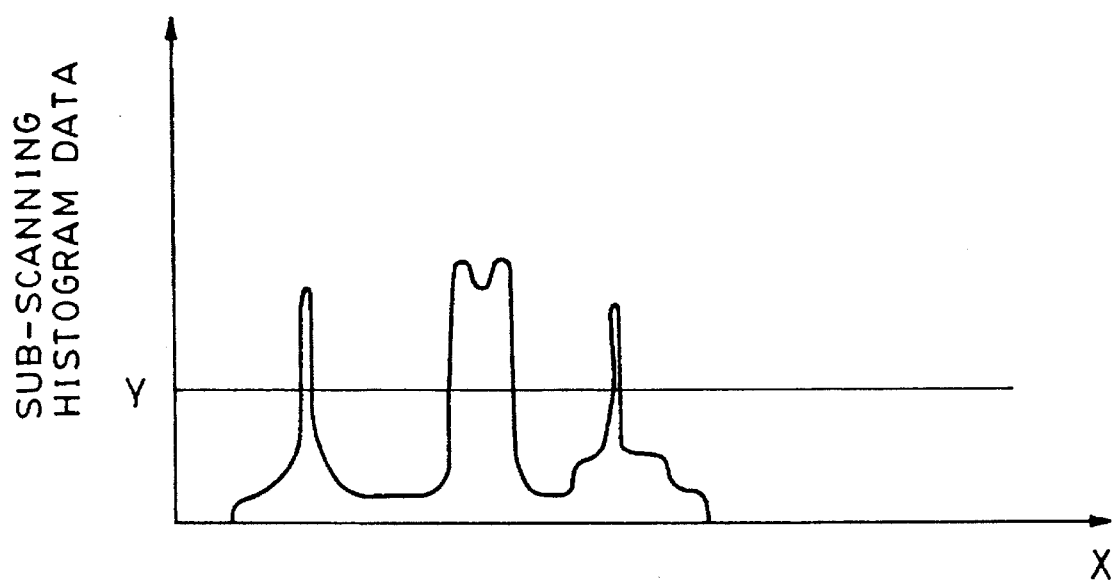
FIGS. 17(A) and 17(B) are illustrations of the histogram data when a registration correction mark is formed on contaminants on a belt and data obtained by binarizing the histogram data.
Figure 17B:
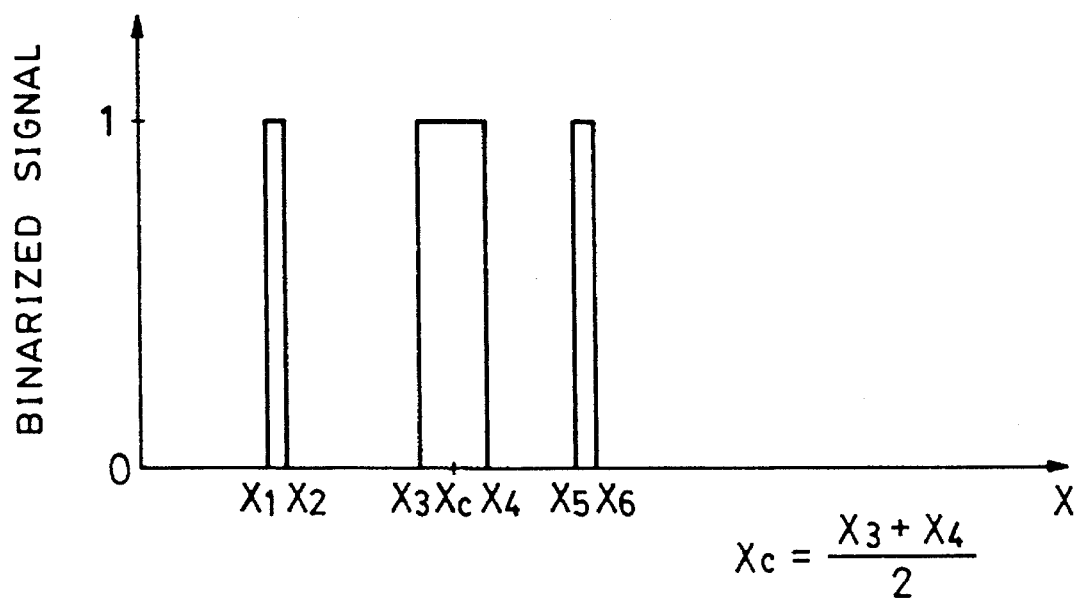

For example, when a registration correction image (pattern image) is formed on the belt contaminants as shown in FIG. 16, sub-scanning histogram data has three peak values. The graph of FIG. 17(A) shows the sub-scanning histogram data, and the graph of FIG. 17(B) shows the sub-scanning histogram data binarized by the threshold value Y. When change points are determined from the binarized data, a set of X1 and X2, a set of X3 and X4, and a set of X5 and X6 can be obtained. Since the thickness of the registration correction mark line is known at the time, a set matching the thickness of the line is searched from each set. For example, in the case of FIG. 17(B), the set of X3 and X4 matches the thickness of the registration correction mark line. Afterwards, the central value can be determined by calculating the average of X3 and X4.

Figure 18:
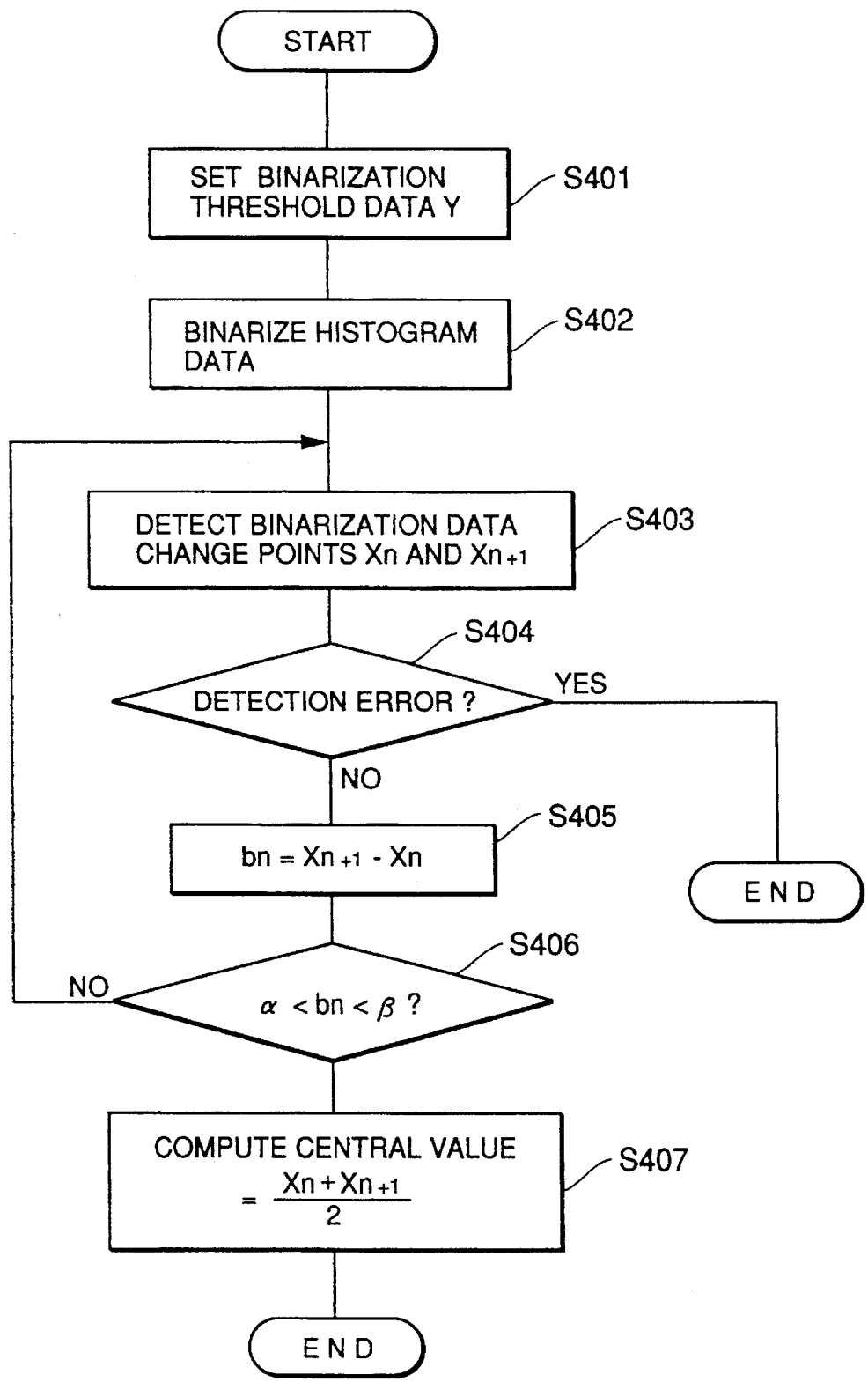
FIG. 18 is a flowchart showing a sequence of computing the center of a registration correction image in accordance with a modification of the second embodiment of the present invention.

The above algorithm is shown in the flowchart of FIG. 18.

Initially, the binarization threshold value Y is set by the unillustrated CPU (S401). The histogram data is binarized by the threshold value Y (S402). Next, change points of binarized data are detected from one end, and these are denoted as $X_n$ and $X_{n+1}$ (S403). If a set of change points cannot be detected, it is regarded as an error, and the process is terminated (S404). When a set of change points can be detected, the difference $X_{n+1}-X_n$ between these change points is calculated. This difference value is denoted as $b_n$ (S404). The magnitude of $b_n$ is compared with the predetermined thickness of the line. For example, when the magnitude of $b_n$ satisfies the relation $\alpha<b_n<\beta$, it is assumed to be a registration correction mark. A determination of whether the mark is a line of a correction mark is made depending upon whether $b_n$ satisfies the above condition (S406). When the above condition has not been satisfied, the process returns to step S403 where a set of the next change points are searched. When the above condition has been satisfied, the average value of $X_n$ and $X_{n+1}$ is calculated to compute the central value (S407).

Second Modification of the Second Embodiment

Figure 19:
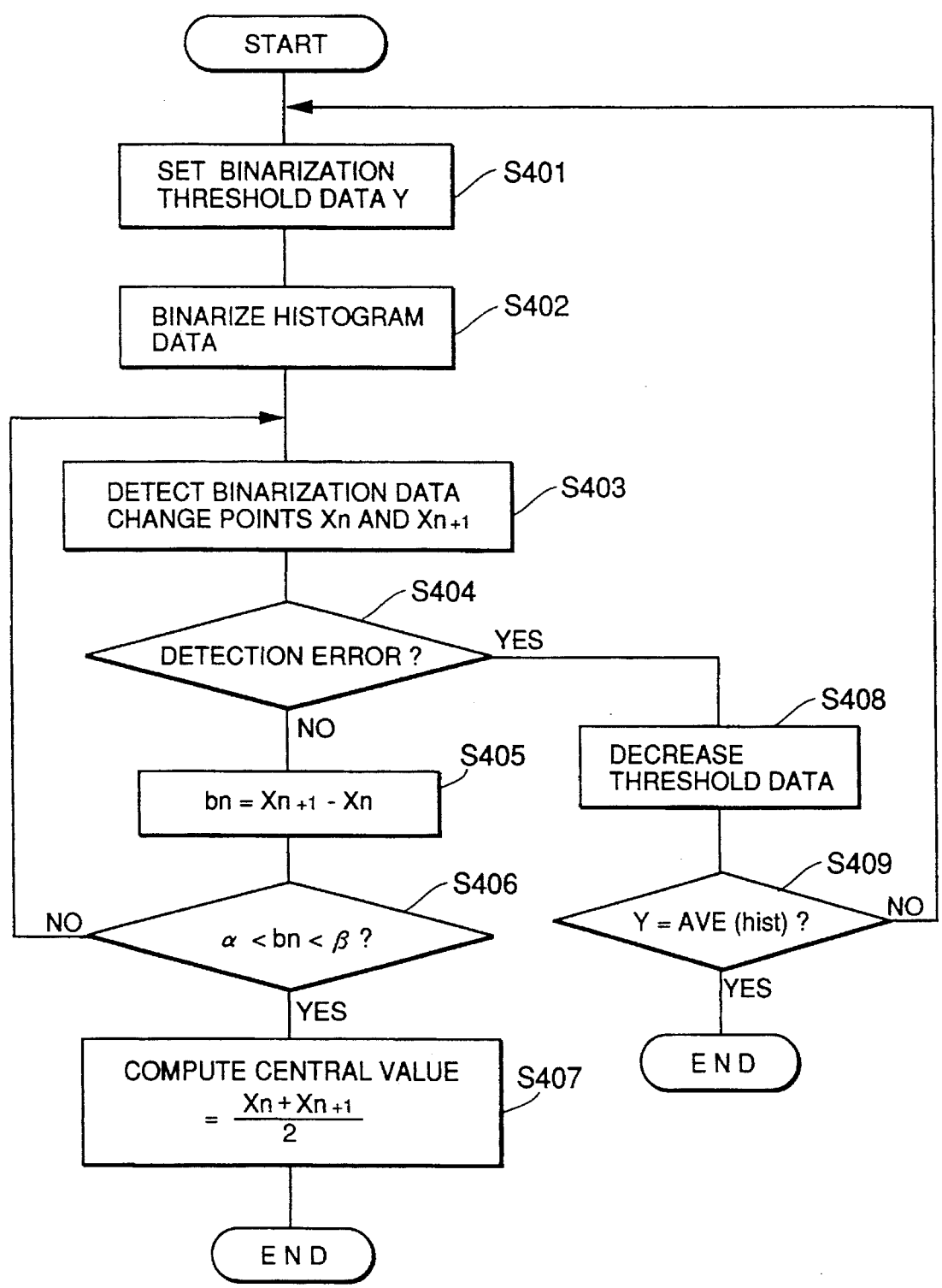
FIG. 19 is a flowchart showing a sequence of computing the center of a registration correction image in accordance with another modification of the second embodiment of the present invention.

The flowchart of FIG. 19 shows another modification of the embodiment shown in FIG. 18. In this embodiment, the setting of the binarization threshold value Y is varied to compute the central position more accurately. The operations in FIG. 19 which are the same as in FIG. 18 have the same step numbers.

Initially, the maximum value MAX (hist) of histogram data is set as the threshold value Y (S401). Thereafter, operations are performed in the same way as in the embodiment of FIG. 18. If it has not been possible to find a set of change points in step S404, the threshold value Y is decreased to a value less than the previous value (S408). If Y becomes smaller than the average value AVE (hist) of the histogram data, it is regarded as an error, and the process is terminated (S409). When Y is greater than the average value, the process returns to step S401 and the operations are performed again.

Since operations are performed as described above according to such an algorithm, the central position of a registration correction image can be determined with a high degree of accuracy by varying the threshold value even when process conditions change or the amount of light of a lamp changes.

Third Embodiment

Next, the third embodiment will be explained with reference to FIGS. 20 to 25. <Construction of Reader>

Figure 20:
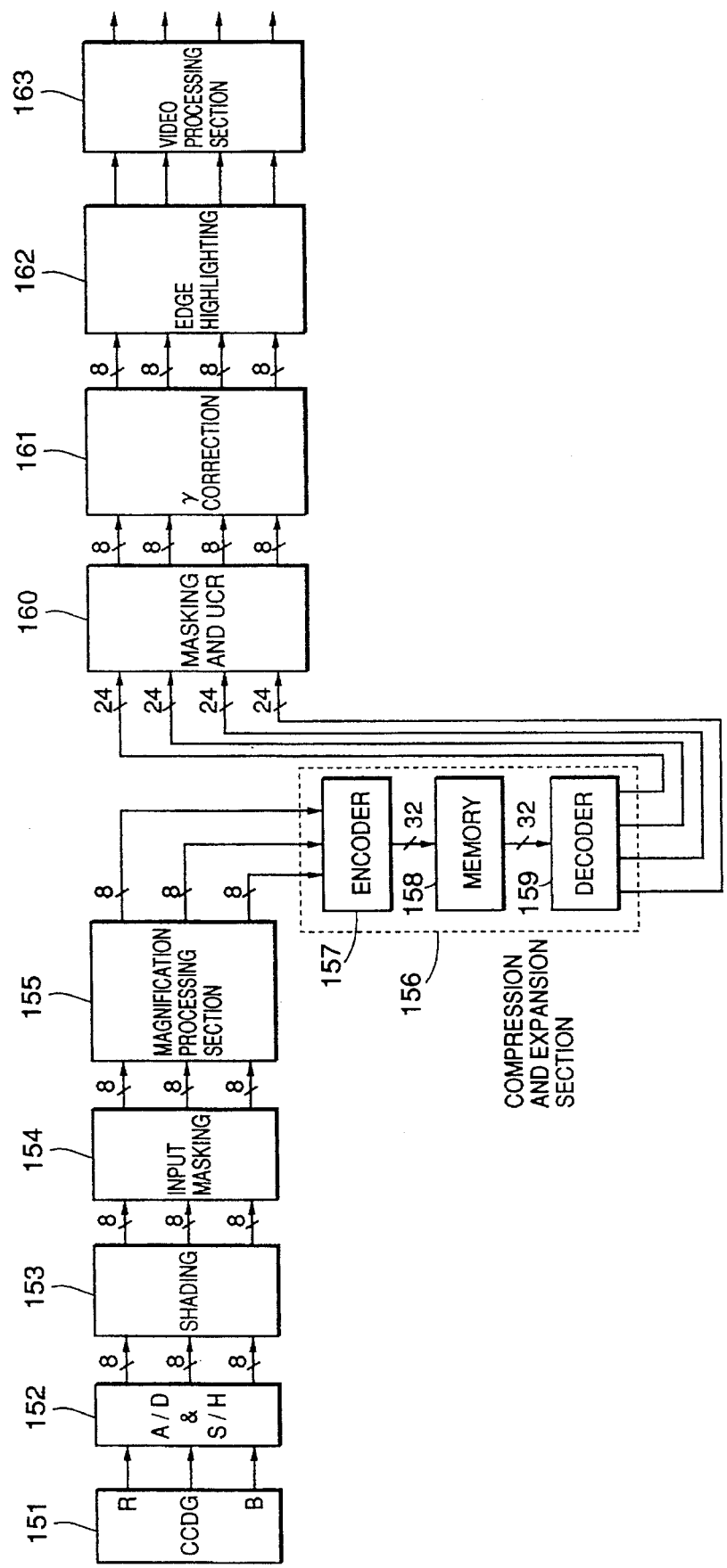
FIG. 20 is a block diagram illustrating the circuitry of a color image processing section (in a reader section) of the image forming apparatus in accordance with a third embodiment of the present invention.

FIG. 20 illustrates the circuitry of a color image processing section which reads an original and records it on recording paper. In the color image processing section, a CCD image sensor (line sensor) 151 provided with filters of three colors R (red), G (green) and B (blue) reads the image of an original. The image data is converted into digital data by an analog/digital conversion and sample hold section (A/D and S/H) 152. The image data is corrected by a shading correction section 153 and an input masking section 154. The image data is magnified by a magnification processing section 155 during a magnification operation. Next, R, G and B data is converted into cyan (Cy), magenta (Ma) and yellow (Ye) data by an encoder section 157 of a compression and expansion section (LOG conversion section 156. The data is stored once in a memory 158.

The image data stored in the memory 158 is read out in synchronization with the respective colors of a printer which will be described later. The image data is passed through a decoder 159 and subjected to masking processing in a masking and UCR (Under Color Removal) section 160. Thereafter, cyan (Cy), magenta (Ma), yellow (Ye) and black (Bk) data of output images are produced by a γ correction section 161 and an edge highlighting section 162. The data is passed through a video processing section 163 and converted into light beams, and the image is recorded on recording paper by means of a printer 103 in FIG. 21 which will be described later. <Construction of Printer>

Figure 21:
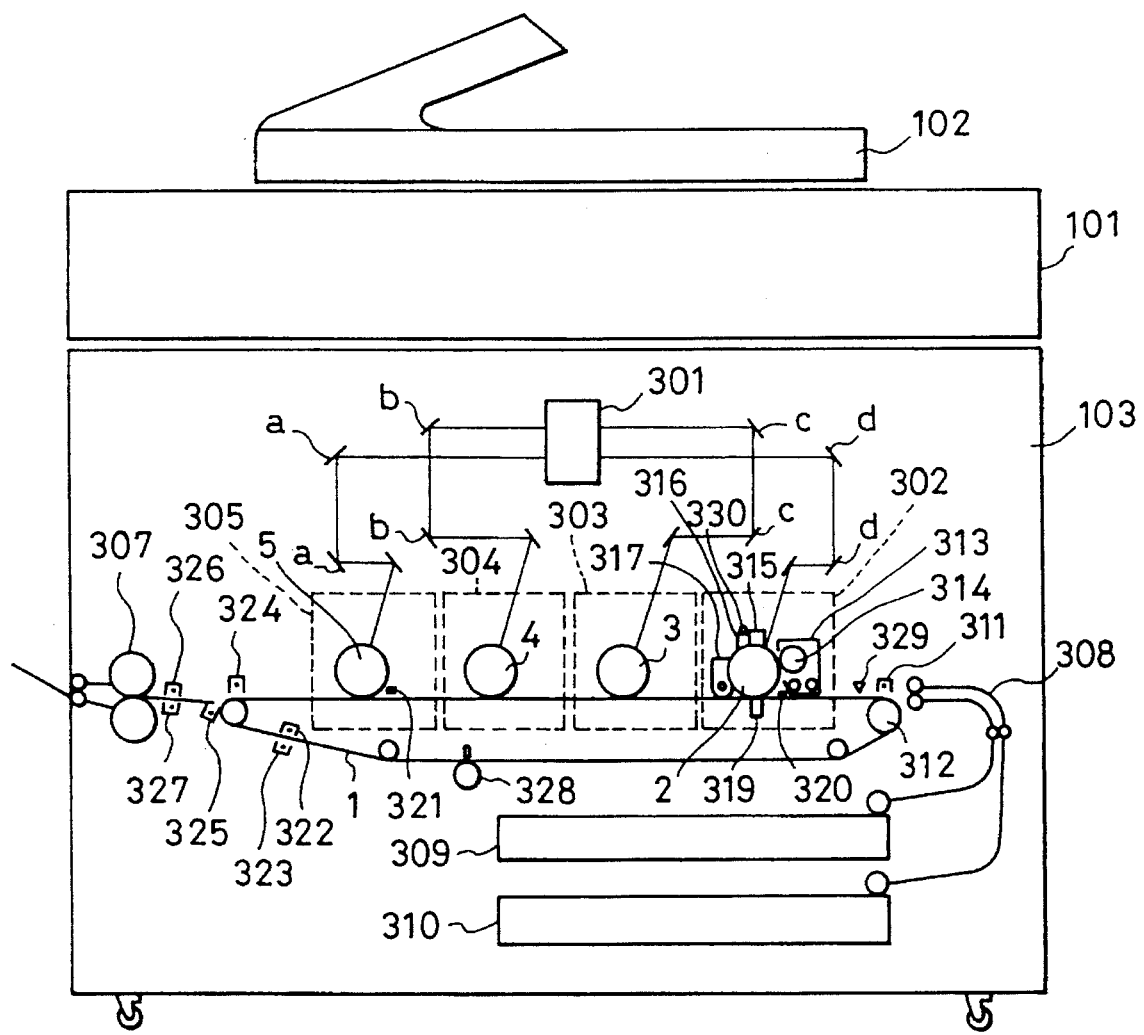
FIG. 21 is a schematic sectional view illustrating a printer section in the image forming apparatus in accordance with the third embodiment of the present invention.
Figure 22:
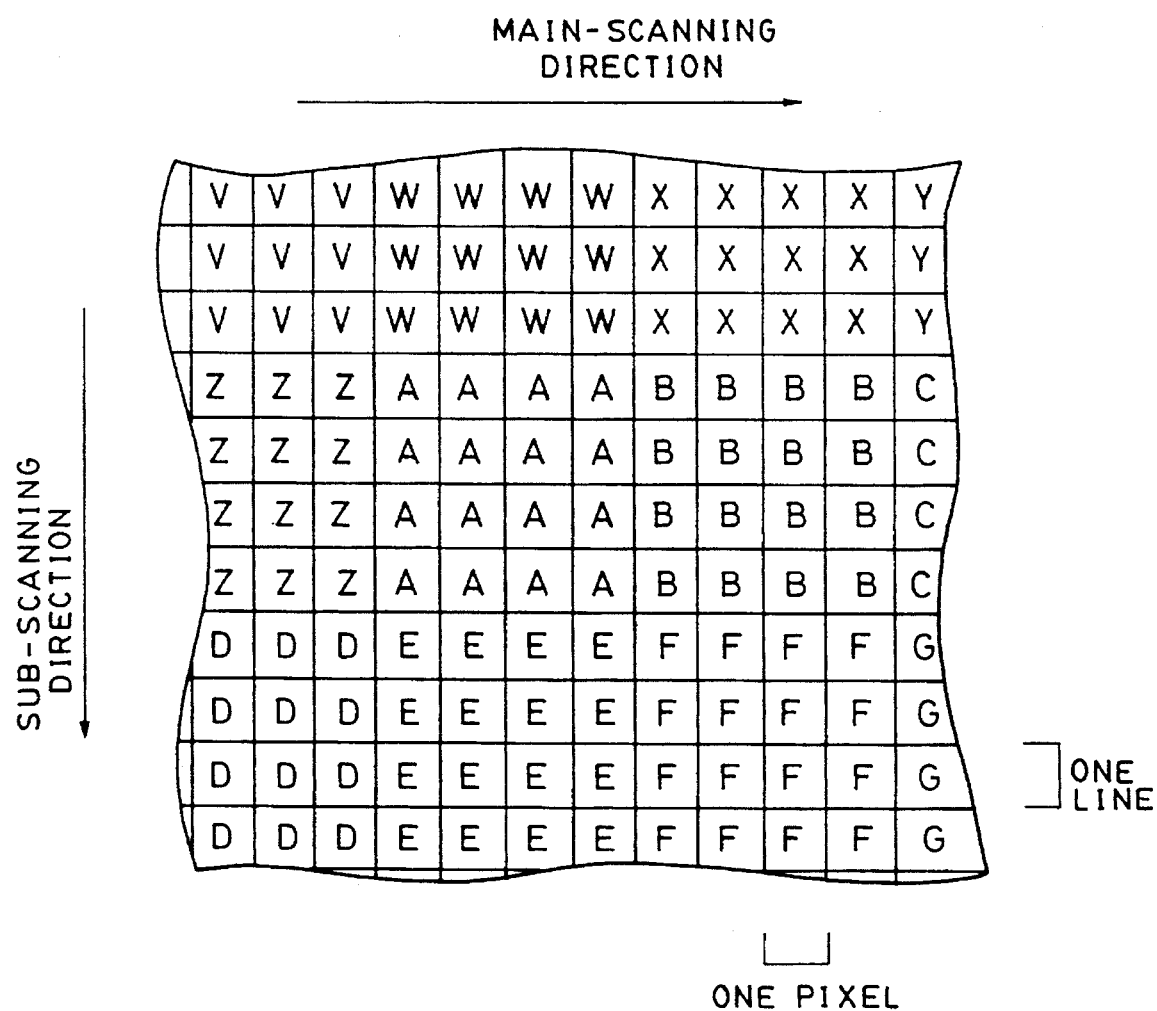
FIG. 22 is a schema illustrating 4 pixels×4 lines to be compressed by a compression and expansion section shown in FIG. 20.

The construction of the printer 103 is shown in FIG. 21. Referring to FIG. 21, reference numeral 301 denotes a polygon scanner for causing light beams generated in the video processing section 163 to scan on the photosensitive drum; reference numeral 302 denotes a first-stage section for forming magenta (Ma) images; and reference numerals 303 to 305 denote sections for forming cyan (Cy), yellow (Ye) and black (Bk) images, respectively.

In the image forming section 302, reference numerals 2 to 5 denote a plurality of photosensitive drums for forming latent images by exposure of light beams; reference numeral 313 denotes a development unit for developing toner on the photosensitive drums 2 to 5; reference numeral 314 denotes a sleeve for applying a development bias to perform toner development; reference numeral 315 denotes a primary charging unit for charging the photosensitive drums 2 to 5 to a desired electrical potential; reference numeral 316 denotes an auxiliary charging unit for eliminating the charge on the surfaces of the photosensitive drums 2 to 5 cleaned by a cleaner 317 in order to obtain satisfactory charge in the primary charging unit 315; reference numeral 317 denotes the cleaner for cleaning the surfaces of the photosensitive drums 2 to 5 after the image is transferred; reference numeral 330 denotes a pre-exposure lamp for erasing the charge remaining on the photosensitive drums 2 to 5; and reference numeral 319 denotes a transfer charging unit for transferring toner images on the photosensitive drums 2 to 5 to a transfer member by discharging from the rear side of the transfer belt 1.

Reference numerals 309 and 310 denote cassettes for housing transfer members (generally, transfer paper); reference numeral 308 denotes a paper feed section for feeding transfer members from the cassettes 309 and 310; and reference numeral 312 denotes a transfer belt roller for rotating the transfer belt 1 and for adhering and charging transfer members supplied from the paper feed section 308 onto the transfer belt 1 in pairs with an adhering and charging unit 311.

Reference numeral 324 denotes a charge-elimination and charging unit for making it easy for transfer members to separate from the transfer belt 1; reference numeral 325 denotes a separation charging unit for preventing an image from being disturbed due to separation discharge produced when the transfer member is separated from the transfer belt 1; reference numerals 326 and 327 each denote pre-fixing charging units for supplementing the adsorption force of toner on the transfer member after the transfer member is separated and for preventing image disturbances; reference numerals 322 and 323 each denote transfer belt charge-elimination and charging units for eliminating the charge on the transfer belt 1 and electrostatically initializing the transfer belt 1; and reference numeral 328 denotes a belt cleaner for removing contaminants on the transfer belt 1.

Reference numeral 307 denotes a fixing unit for thermally fixing a toner image on the transfer section, which is separated from the transfer belt 1 and charged again by the pre-fixing charging unit 326 and 327, onto a transfer member.

Reference numeral 329 denotes a paper leading-edge sensor for detecting the leading edge of a transfer member fed on the transfer belt 1. A detection signal from the paper leading-edge sensor is sent from the printer 103 to a reader 101 where the signal is used as a sub-scanning synchronization signal when a video signal is sent from the reader 101 to the printer 103.

The video processing section 163 processes C, M, Y and K video signals sent via the original reading apparatus (reader) 101 and generates light beam signals which have been pulse-width-modulated (PWM). <Method of Registration Correction>

As the method of registration correction is the same as that of the first embodiment shown in FIGS. 1 to 5, an explanation thereof is omitted. <Data Compression System>

Referring back to the circuit of the reader section of FIG. 20, a processing system for storing encoded signals in a memory will be explained.

Encoded data is compressed by the encoder section 157. For example, a schema of 4 pixels×4 lines to be compressed, shown in FIG. 22, will be considered. One cell thereof corresponds to one pixel. One pixel has the data of three colors of R, G and B, each color composed of 8 bits. This data is converted into color component signals of L*, a* and b* with the data of 4 pixels×4 lines, i.e., 16 pixels as one block. This data of 16 pixels×3 colors×8 bits=384 bits is compressed to a fixed length of 1/12th of the total and form 32-bit data. For this compression, vector quantization, an orthogonal transfer encoding method or the like is used.

This data is stored in the memory 158 as image data A. The four colors of data are processed simultaneously and sent to the C, M, Y and K decoder sections 159 as image data B. The data is expanded to 24 bits as regards C, M, Y and K, masked by the respective masking sections 160 for C, M, Y and K, and restored to image data, each of which data being 8 bits for C, M, Y and K.

The reason why steps for compressing, storing and expanding image data are needed as described above is that the positions of image data are different on the screen, which positions are needed by the various image forming sections at certain times, in a printer in which the positions of the image forming sections 302 to 305 for the colors of the printer 103 shown in FIG. 21 are different. Storage means is used as delay means for compensating for time deviations thereof. Compression and expansion are performed to reduce the capacity of the storage means by reducing the amount of image data. <Structure of Memory>

Next, the memory 158 will be explained.

Figure 23:
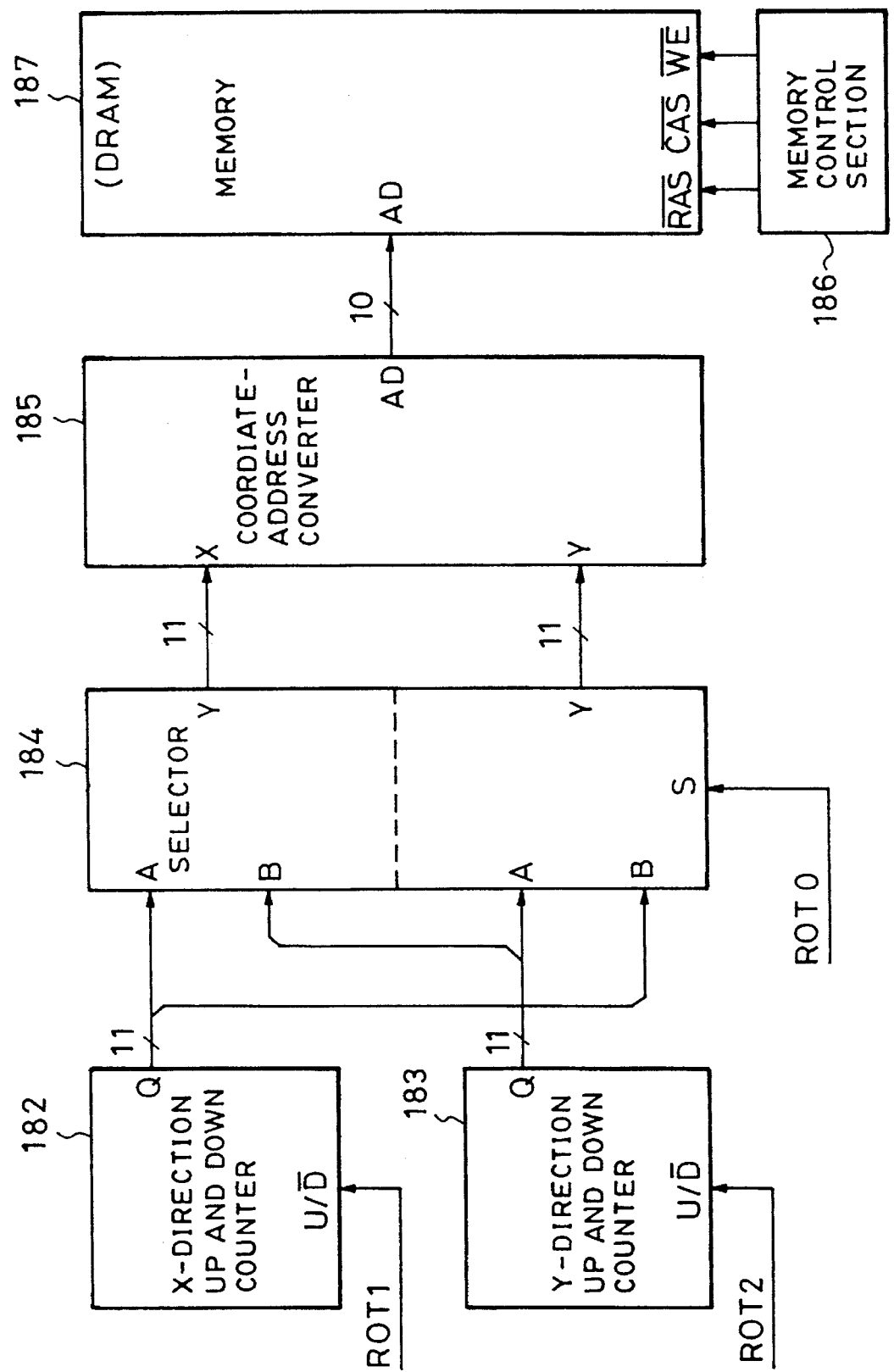
FIG. 23 is a block diagram illustrating the circuitry of an address generating circuit as the internal arrangement of a memory section shown in FIG. 20.
Figure 24A:
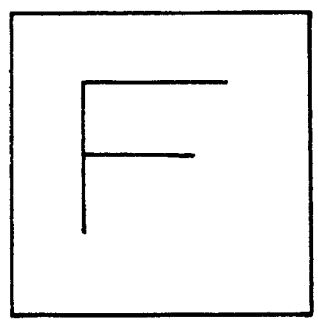
FIGS. 24(A) to 24(H) are illustrations of an image rotated by the address generating circuit shown in FIG. 23.
Figure 24B:
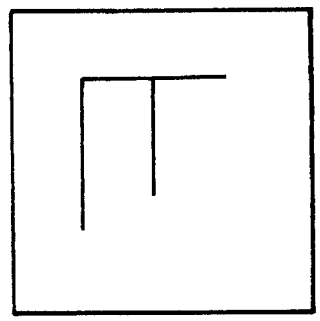
Figure 24C:
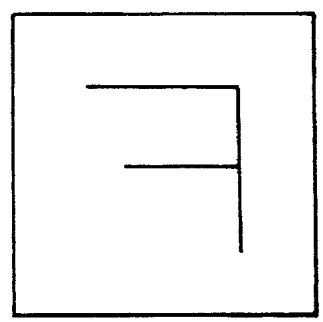
Figure 24D:
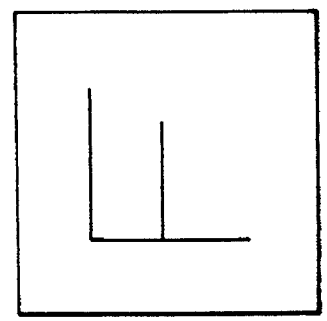
Figure 24E:
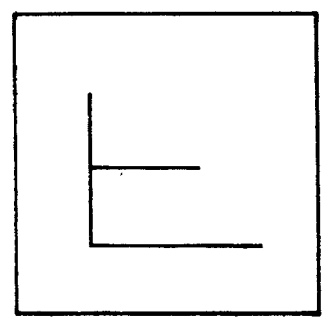
Figure 24F:
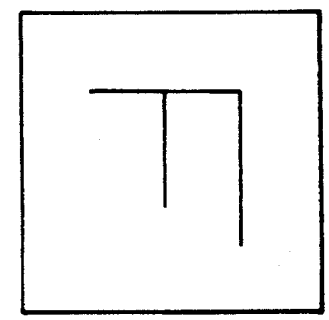
Figure 24G:
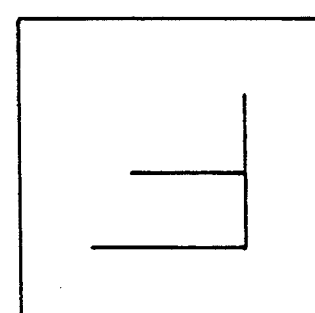
Figure 24H:
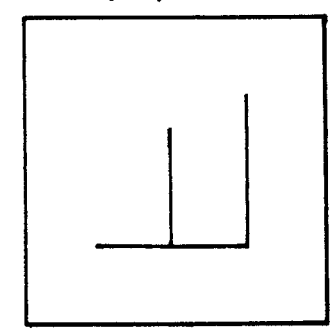

As shown in FIG. 23, an address generation circuit (memory address controller) within the memory 158 comprises an up-down counter 182 in the main-scanning direction (X direction); an up-down counter 183 in the sub-scanning direction (Y direction); a selector 184 for switching the output from these two counters; a coordinate-address converter 185 for converting the output from the counters to the address of a memory 187 (though a DRAM is used in this embodiment, other memories may be used); and a memory control section 186 for generating RAS, CAS and WE signals (all of which are low-active signals). If a select signal of the selector 184 is denoted as ROT, up-down switching signals of the X counter 182 and the Y counter 183 are denoted as ROT1 and ROT2, respectively, the signals of the three bits thereof enables eight kinds of images shown in FIGS. 24(A) to 24(H) to be output. <System for Adjusting and Outputting Image Data from Reader>

Next, a system for adjusting and outputting image data from the reader 101 will be explained.

Since the operation for reading the image of an original is performed one time, a combination of 4×4 pixels (for example, the group "A" of pixels in FIG. 22) is uniquely determined. However, in the case of a printer having a plurality of drums 2 to 5 as described above, if the number of lines in the space between drums has an integer multiple of 4, deviations of image data of C, M, Y and K sent from the reader 101 to the printer 103 can be adjusted by adjusting the address counter of the memory 158. If the number of lines in the space between drums does not have an integer multiple of 4, registration deviations of image data cannot be adjusted.

Therefore, in this embodiment, a decoder 159 is provided for each of C, M, Y and K. The image data is expanded by the decoder 159 at timings of each of C, M, Y and K on the basis of the registration information (timing setting data) β509.

Figure 25:
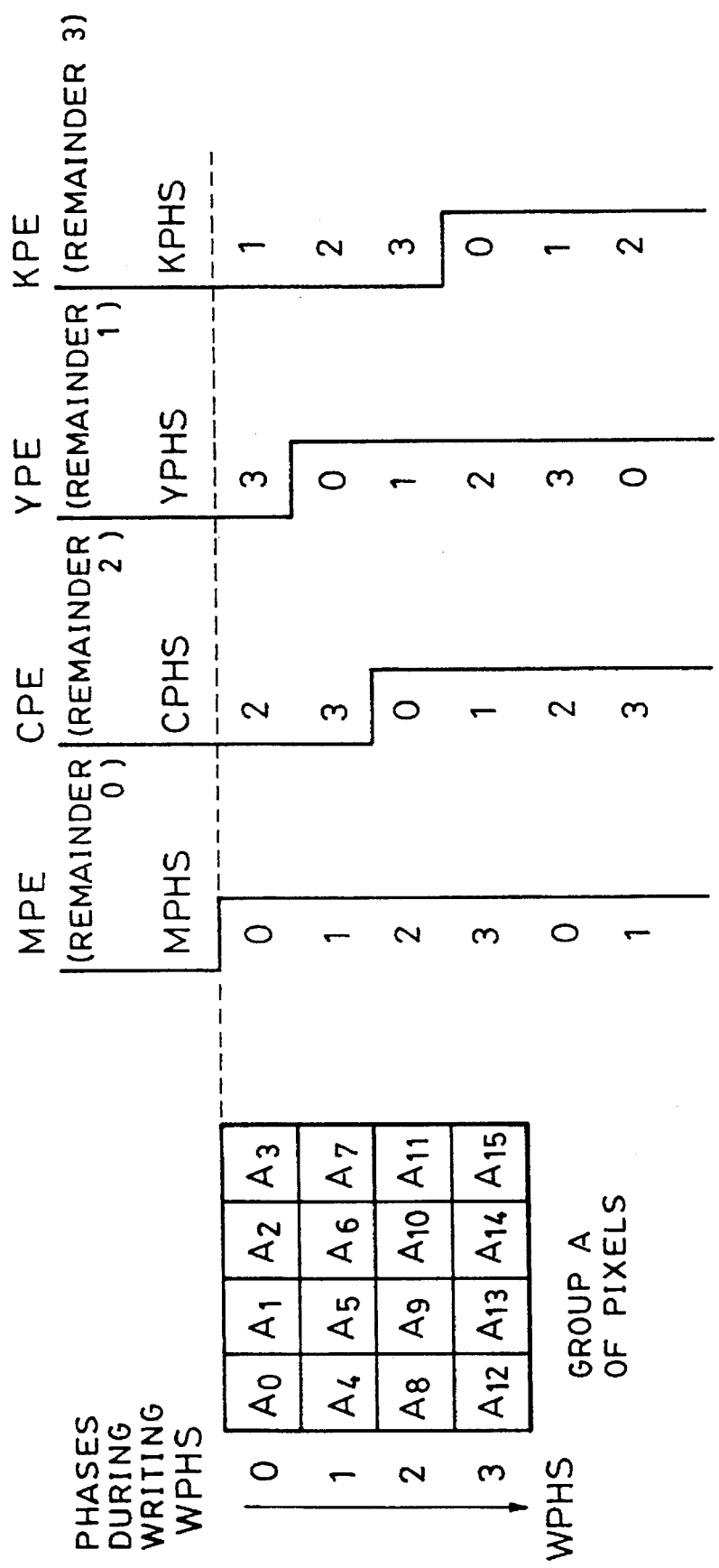
FIG. 25 illustrates a relationship between sub-scanning enable signals for each color and phase signals in accordance with the third embodiment of the present invention.

The purpose of FIG. 25 is to show differences in sub-scanning enable signals when the group "A" of pixels are expanded. As shown in FIG. 25, when a phase signal WPHS during writing in the memory changes as 0, 1, 2, 3, 0, 1, 2, 3, etc., if a maximum sub-scanning enable MPE is enabled when, for example, WPHS=0, the magenta phase signal MPHS becomes 0, 1, 2, 3, etc. If a cyan sub-scanning enable CPE is enabled when, for example, WPHS=2, a cyan phase signal CPHS becomes 2, 3, 0, 1, etc. Similarly, YPHS and KPHS change as shown in FIG. 25.

As image data is expanded in response to phase signals WPHS, CPHS, YPHS and KPHS for C, M, Y and K colors, respectively, in the expansion circuits 156 of C, M, Y and K, the rise positions of the respective sub-scanning enable signals become the leading edge of the image, causing no line deviation. These respective phase signals are made variable each time the registration information β509 varies.

First Modification of the Third Embodiment

A case will be considered in which the image of an original is read, the read image data is stored one time in the change memory 158, and the stored data is read repeatedly a plurality of times in the above-described third embodiment of the present invention.

Since in the third embodiment the amount of relative deviations of C, M, Y and K are adjusted in accordance with the phase WPHS at the time of writing data in the memory 158, when image data is read out from the memory 158 repeatedly a plurality of times, deviations of 0 to 3 lines occur when the entire image is evaluated though the positional relationships of C, M, Y and K are the same when outputs of the first and second images are compared.

Figure 26:
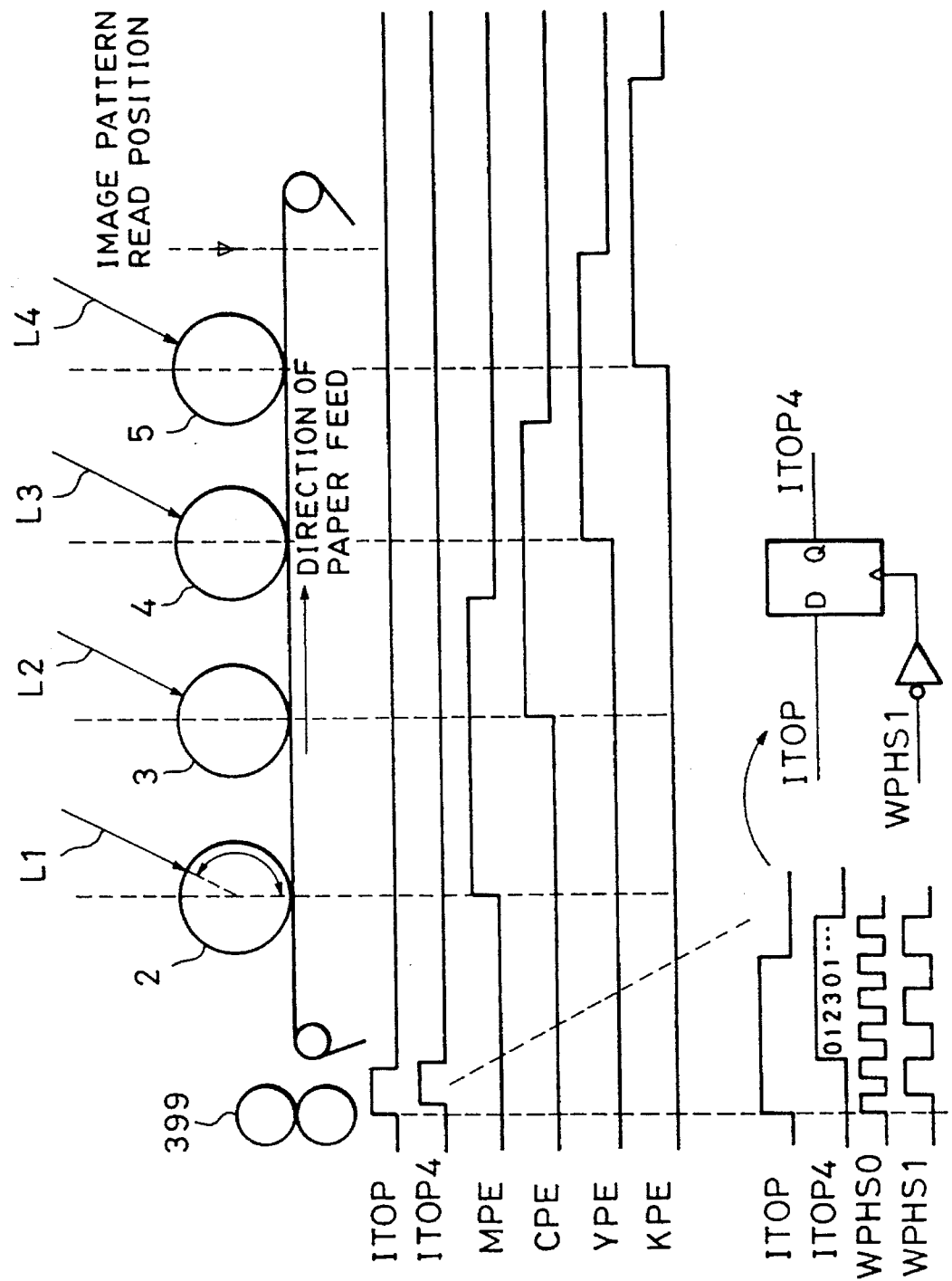
FIG. 26 is a timing chart illustrating a relationship between sub-scanning enable signals for each color and phase signals in accordance with a modification of the third embodiment of the present invention.

In this connection, as shown in FIG. 26, the leading edge of the image on the printer 103 is made to match the writing phase WPHS to always obtain a constant image output. For this purpose, a regist roller 399 is at a temporary stop position for paper feed timing, an ITOP4 signal is produced by making the ITOP signal which is output when paper is fed therefrom synchronize with the WPHS signal, so that the relative positions from the sub-scanning enable signals of MPE, CPE, YPE and KPE, and from the ITOP4 signal are maintained constant. As a result, distortion-free image output can always be obtained no matter how many times image data is output from the memory 158.

Second Modification of the Third Embodiment

Next, another modification of the third embodiment of the present invention will be explained.

Figure 27:
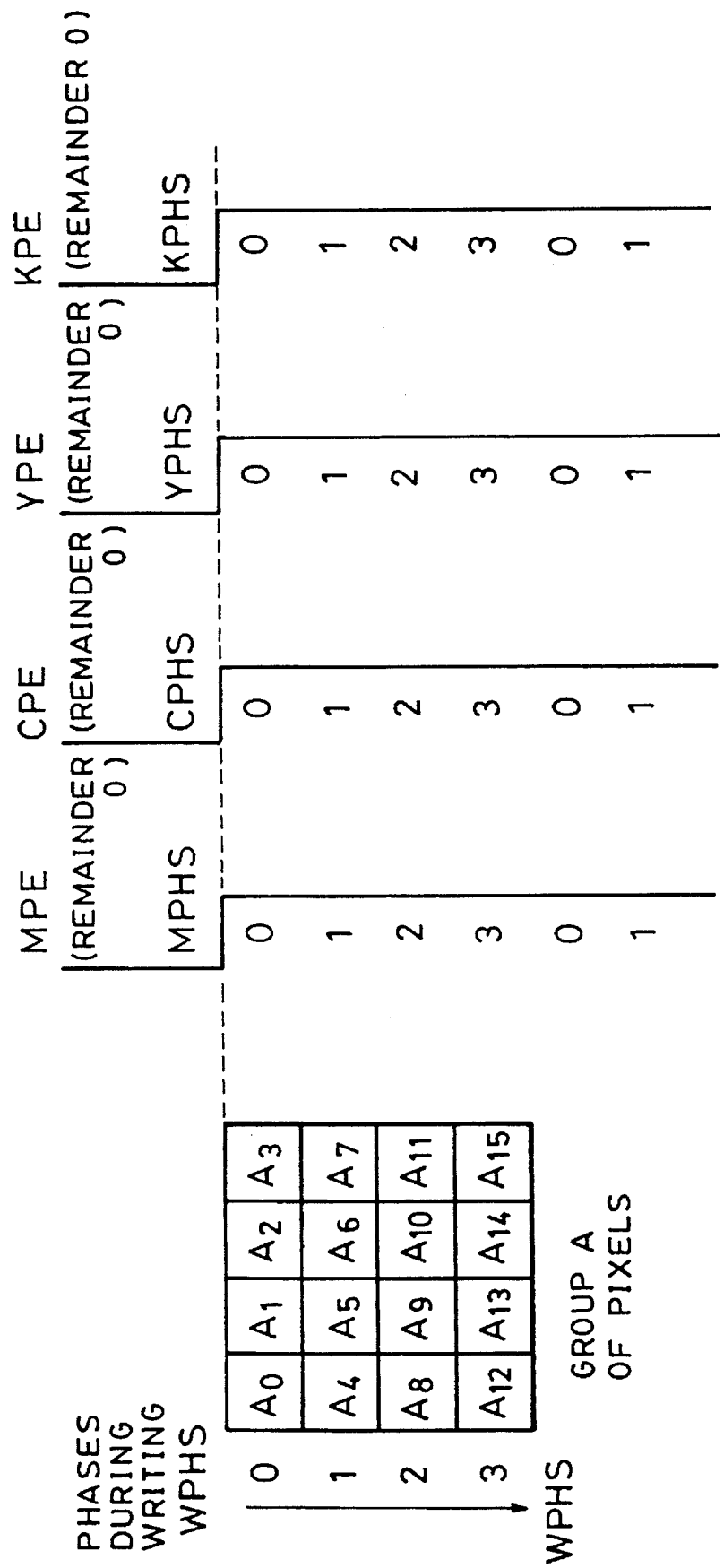
FIG. 27 is a timing chart illustrating a relationship between sub-scanning enable signals for each color and phase signals in accordance with another modification of the third embodiment of the present invention.

In this embodiment, reading of data from the memory 158 is performed at the same phase as writing therein. Synchronization of images is performed in accordance with registration information at the final step. As shown in FIG. 27, a sub-scanning enable signal is generated so that the differences in the sub-scanning enable signals when the group "A" of pixels are read out becomes the same. The example in this figure illustrates when the remainders of both the phase WPHS, and the sub-scanning enable signals MPE, CPE, YPE and KPE become zero. The sub-scanning signal is generated so that it is at a position less than the actual sub-scanning image signal rise position and the greatest signal of multiples of four.

Figure 28:
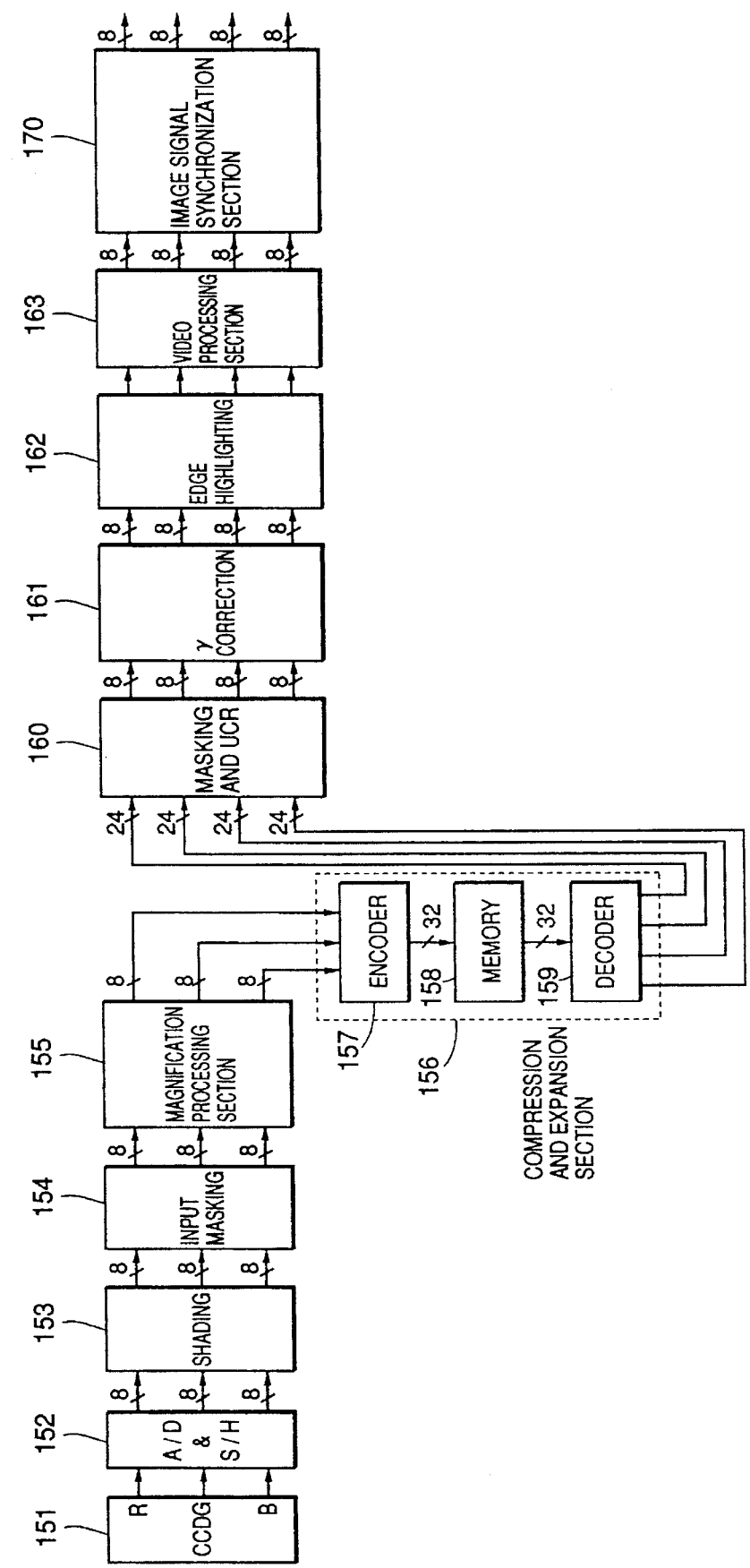
FIG. 28 is a block diagram illustrating the construction of the reader section of the image forming apparatus which is involved in the process of FIG. 27.

The flow of the image signals is shown in FIG. 28. In this block diagram, blocks having the same functions as in FIG. 20 are given the same reference numerals. As explained in FIG. 20, image signals synchronize with sub-scanning signals which are multiples of four up to the video processing section 163, and the signals are processed at the same phase positions. Thereafter, the image signals are input to an image signal synchronization section 170 and output to the printer 103 in synchronization with registration information.

Figure 29:
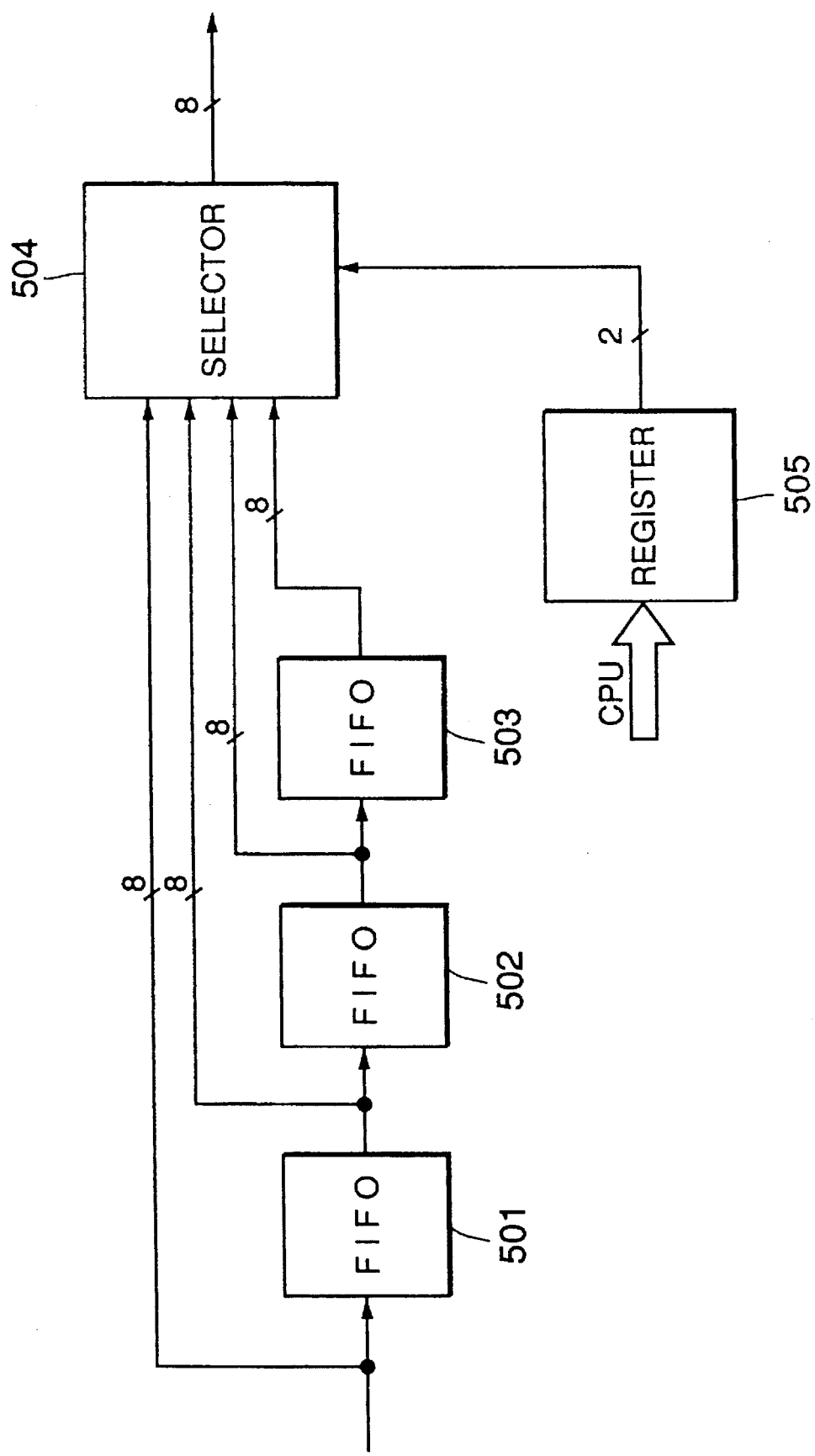
FIG. 29 is a block diagram illustrating one color portion of an image signal synchronization section of FIG. 28.
Figure 30:
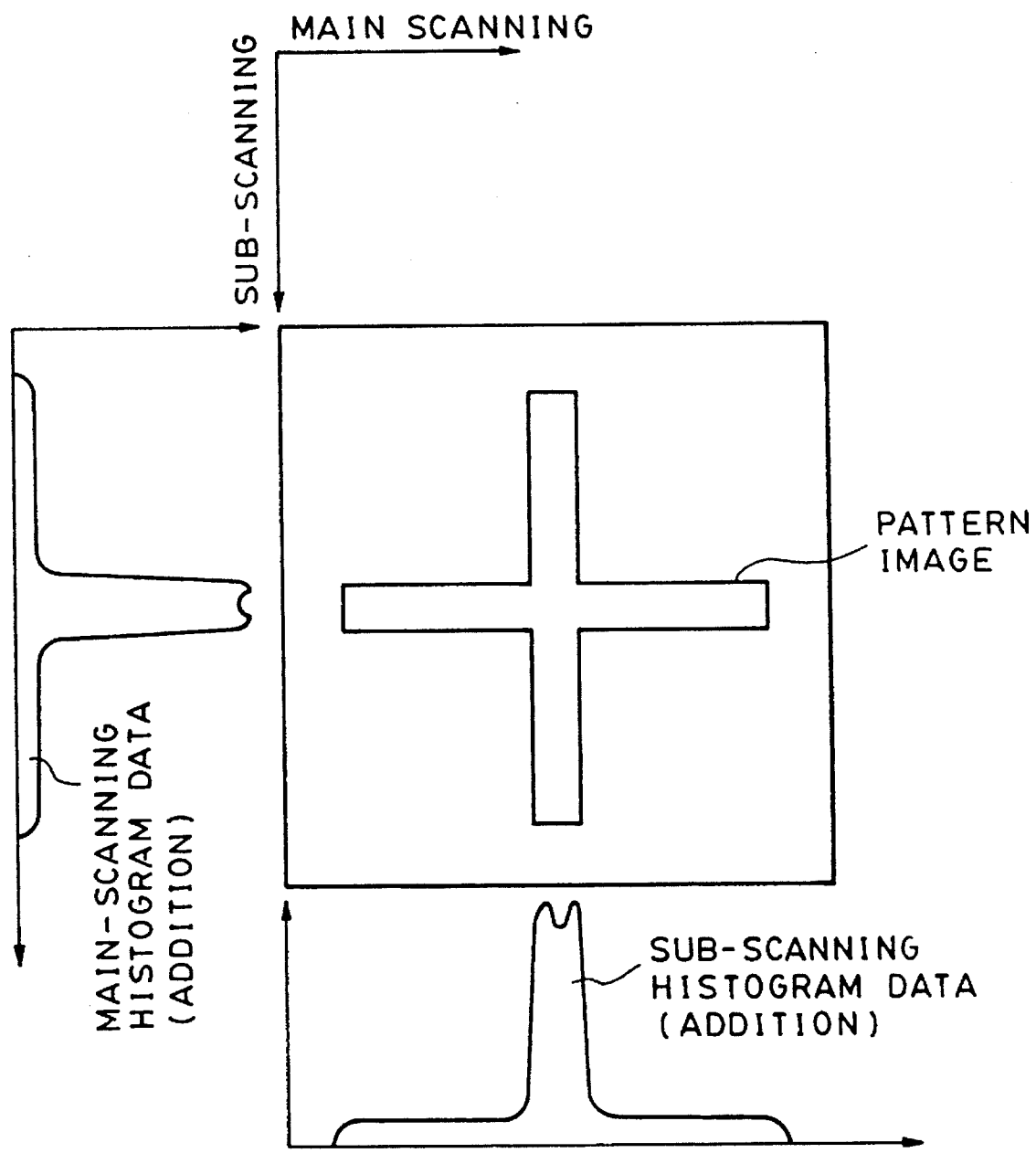
FIG. 30 is an illustration of a pattern image when data is lost during transfer and the histogram data thereof.
Figure 31:
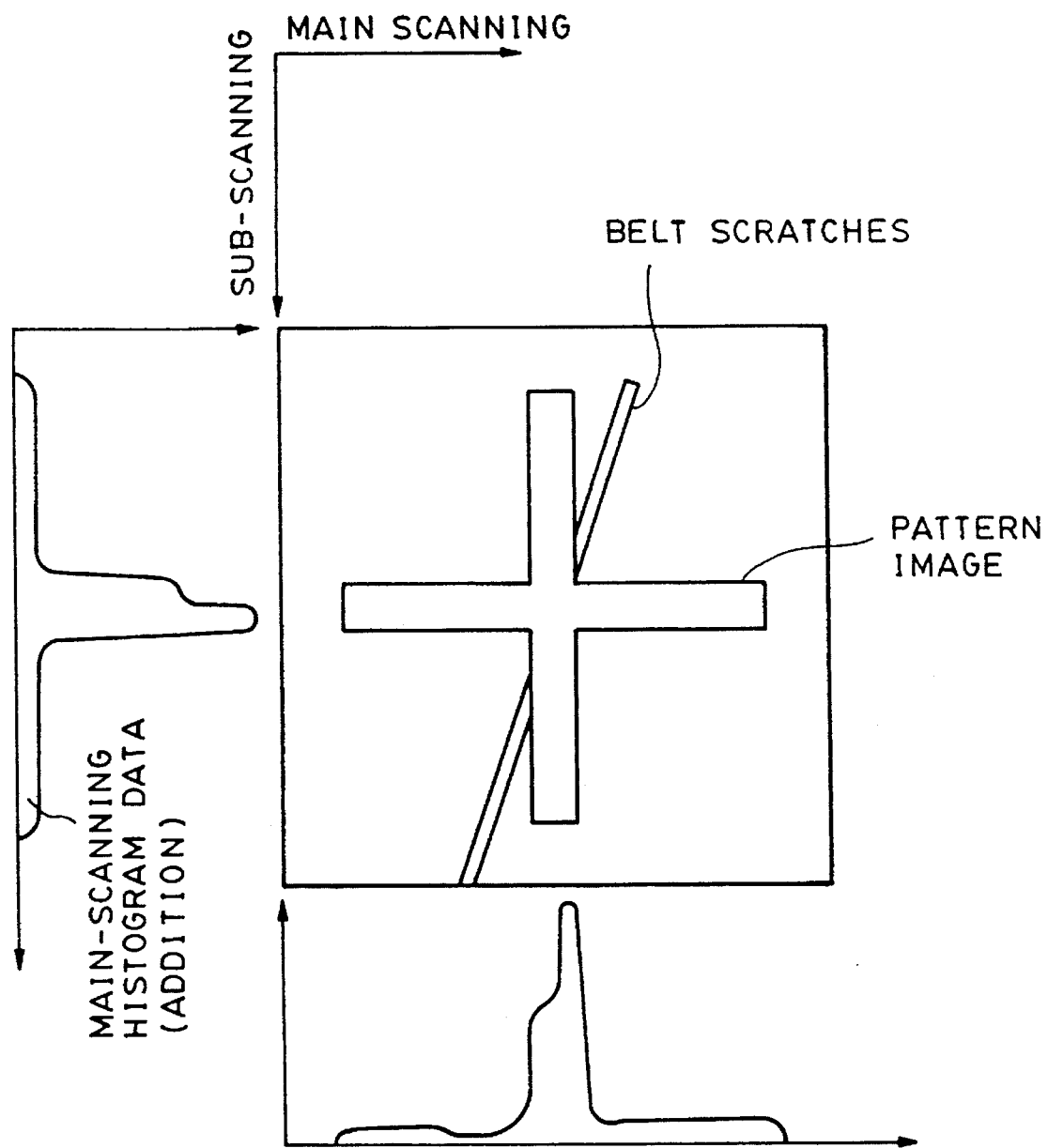
FIG. 31 is an illustration of a pattern image when a registration correction mark is formed on scratches on the belt and the histogram data thereof.

FIG. 29 illustrates the construction for one color of the image signal synchronization section 170. Reference numerals 501 to 503 each denote first-in first-out (FIFO) circuits. The phase at which image signals rise in accordance with registration information is set in a register 505 by the unillustrated CPU. A selector 504 outputs a signal produced by delaying the image signals in response to the select signal from the register 505.

As has been explained above, output images without irregularities can be obtained in accordance with registration information.

According to the present invention, as described above, the following advantages can be obtained:

(1) Registration correction for each color can be performed with accuracy according to the amount of registration deviations and the deviation condition since each registration correction image mark transferred onto transport members is read; and the amount of deviation of each of the other colors on the basis of the positional data of the read image data and timings for a series of registration corrections are controlled on the basis of the computed amount of deviations.

(2) Registration deviations of each image carrier can be corrected with a high degree of accuracy because: addition histogram data is created on the basis of the density data of the read registration correction image mark; the created histogram data is binarized by a threshold value and the central position of each registration correction image mark is determined on the basis of the obtained binarized data; the central position of the registration correction image can be determined accurately irrespective of scratches on the transport member (transfer belt) or changes in the process conditions; and registration deviation information of each color is accurately computed on the basis of the obtained central position information.

(3) High-quality images without registration deviations can be reproduced because the amounts of the registration deviations of a plurality of image forming means are detected when image data stored in block units is output by a plurality of image forming means, and the registration deviations are corrected in accordance with the amount of deviations not only in block units but also in pixel units.

Except as otherwise disclosed herein, the various components shown in outline or in block form in the figures are individually well-known in their internal construction and operation and are not critical either to the making or using of this invention or to a description of the best mode of the invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An image forming apparatus which determines a timing between detection of each of plural registration images, said image forming apparatus comprising:

image forming means for forming plural registration images;

detecting means for detecting each registration image and for determining a registration deviation by which each registration image deviates from a predetermined position; and determining means for determining a timing at which said detecting means operates to detect a subsequent registration image on the basis of the registration deviation for a prior registration image determined by said detecting means.

2. An image forming apparatus according to claim 1, wherein said image forming means comprises a plurality of image forming units for forming images to be superimposed on a recording medium, and wherein said detecting means detects an amount of registration deviation of each image formed by each image forming unit.

3. An image forming apparatus according to claim 2, further comprising generating means for generating a pattern signal corresponding to a predetermined pattern, wherein said detecting means detects the amount of registration deviation of each image based on the pattern signal.

4. An image forming apparatus according to claim 3, further comprising a transport belt for transporting a recording medium through the plurality of image forming units, wherein the plurality of image forming units also form the images on said transport belt.

5. An image forming apparatus according to claim 2, further comprising connection means for performing at least one of mechanical connection and electrical connection of said image forming units on the basis of the amount of registration deviation detected by said detecting means.

6. An image forming apparatus according to claim 5, further comprising inhibiting means for inhibiting correction by said correction means when the amount of registration deviation detected by said detecting means is less than a predetermined value.

7. An image forming apparatus according to claim 5, wherein said correction means makes mechanical and electrical corrections when the amount of registration deviation detected by said detecting means is greater than a predetermined value, and wherein said correction means makes electrical corrections when said amount of deviation is less than the predetermined value.

8. An image forming apparatus according to claim 2, wherein the plurality of image forming units form images according to an electrophotographic method employing light beams.

9. An image forming apparatus according to claim 3, wherein said detecting means comprises means for optically detecting the predetermined pattern.

10. An image forming apparatus according to claim 9, wherein each of the plurality of image forming units forms images of plural different color components, and wherein said detecting means detects a positional deviation between a predetermined pattern of a reference color component and a predetermined pattern of at least one other color component.

11. An image forming apparatus, comprising:
generating means for generating a pattern signal corresponding to a predetermined pattern;
image forming means for forming the predetermined pattern from the pattern signal generated by said generating means, and for forming images from image data;
detecting means for detecting the predetermined pattern formed by said image forming means;
histogram generating means for generating a histogram of the predetermined pattern detected by said detecting means;
binarizing means for binarizing the histogram generated by said histogram generating means to generate binarized data; and
correcting means for correcting positions at which images are formed by said image forming means on the basis of the binarized data generated by said binarizing means.

12. An image forming apparatus according to claim 11, wherein said histogram generating means generates histograms for main-scanning positions and sub-scanning positions.

13. An image forming apparatus according to claim 11, wherein said image forming means comprises a plurality of image forming units, each for forming different color components respectively, and wherein said correcting means comprises computing means for computing a positional deviation between a predetermined pattern of a reference color component and a predetermined pattern of at least one other color component.

14. An image forming apparatus according to claim 11, wherein a threshold value used by said binarizing means is changeable.

15. An image forming apparatus according to claim 14, further comprising recognizing means for recognizing whether features of the predetermined pattern are present on the basis of an output from said binarizing means, wherein when said recognizing means recognizes that the features of the predetermined pattern are not present, said binarizing means varies a binarization threshold value.

16. An image forming apparatus comprising:
storage means for storing image data in block units, each block unit corresponding to a plurality of pixels;
image reading means for reading out the block units of image data stored in said storage means, and for outputting the read-out image data to a plurality of image forming sections, each of the plurality of image forming sections for forming a color component image comprised of one of a plurality of color components; and
timing adjustment means for adjusting a timing at which the block units of image data are read out from said storage means by said image reading means in units smaller than the units of said blocks in accordance with an amount of registration deviation of each color component image from a predetermined position.

17. An image forming apparatus according to claim 16, further comprising coding means for compressing the input image data and for coding the input image data in block units.

18. An image forming apparatus according to claim 17, further comprising a plurality of expansion means, disposed in correspondence with the plurality of image forming sections, for expanding image data stored in said storage means, wherein said timing adjustment means causes an expansion means corresponding to one color component to operate at a timing corresponding to an amount of deviation of the one color component.

19. An image forming apparatus according to claim 16, wherein said timing adjustment means comprises FIFO circuits which store the block units of image data read out by said image reading means, and wherein the image reading means reads out the block units of image data at a timing corresponding to an amount of deviation of each color component.

20. An image forming apparatus according to claim 11, wherein said correcting means detects changing points in an output of said binarizing means and performs a correcting operation on the basis of the changing points.

21. An image forming apparatus according to claim 11, wherein said histogram generating means comprises means for storing a histogram.

22. An image forming apparatus according to claim 11, wherein said correcting means comprises storing means for storing an output of said binarizing means and for detecting a positional deviation of the image formed by said image forming means by using the output of said binarizing means stored by said storing means.

23. An image forming apparatus according to claim 11, wherein said correcting means performs at least one of a mechanical correction and an electrical correction of a positional deviation of the images formed by said image forming means.

24. An image forming apparatus according to claim 23, wherein said image forming means forms an image according to an output image signal, and said correcting means changes an output timing of the image signal to said image forming means on the basis of the histogram.

25. An image forming apparatus according to claim 23, wherein said image forming means comprises an image holding member and an optical system for irradiating a beam onto said image holding member, and said correcting means controls the optical system according to the histogram.

26. An image forming apparatus according to claim 11, wherein said image forming means forms a plurality of sets of the predetermined patterns from the pattern signal, and said histogram generating means generates a plurality of histograms of each of the plurality of sets of the predetermined patterns.

27. An image forming apparatus according to claim 26, wherein said correcting means corrects a position of an image formed by said image forming means on the basis of binarized data obtained by binarizing the plurality of the histograms of the plurality of sets of the predetermined patterns.

28. An image forming apparatus according to claim 17, further comprising scanning means for scanning an image to output the image as input image data to said coding means.

29. An image forming apparatus according to claim 16, further comprising detecting means for detecting positional deviations of the color component images formed by said plurality of image forming sections.

30. An image forming apparatus according to claim 16, further comprising signal generating means for generating a predetermined reference signal, and wherein said timing adjusting means adjusts a read-out timing of the image data in accordance with the predetermined reference signal.

31. An image forming apparatus, comprising:
generating means for generating a pattern signal corresponding to a predetermined pattern;
image forming means for forming the predetermined pattern from the pattern signal generated by said generating means, and for forming images from image data;
detecting means for detecting the predetermined pattern formed by said image forming means;
histogram generating means for generating a histogram of the predetermined pattern detected by said detecting means;
binarizing means for binarizing the histogram generated by said histogram generating means to generate binarized data; and
position detecting means for detecting a position of the predetermined pattern formed by said image forming means on the basis of the binarized data generated by said binarizing means.

32. An image forming apparatus according to claim 31, wherein said image forming means comprises a plurality of image forming units, each for forming different color components respectively, and wherein said position detecting means comprises computing means for computing a positional deviation between a predetermined pattern of a reference color component and a predetermined pattern of at least one other color component by using the binarized data generated by said binarizing means.

33. An image forming apparatus according to claim 31, wherein a threshold value used by said binarizing means is changeable.

34. An image forming apparatus according to claim 33, further comprising recognizing means for recognizing whether features of the predetermined pattern are present on the basis of an output from said binarizing means, wherein when said recognizing means recognizes that the features of the predetermined pattern are not present, said binarizing means varies a binarization threshold value.

35. An image forming apparatus according to claim 31, wherein said position detecting means detects changing points in an output of said binarizing means and detects the position of the predetermined pattern on the basis of the changing points.

36. An image forming apparatus according to claim 31, wherein said histogram generating means comprises means for storing a histogram.

37. An image forming apparatus according to claim 31, wherein said position detecting means comprises storing means for storing the binarized data output by said binarizing means, and wherein said position detecting means detects the position of the predetermined pattern by using the binarized data output by said binarizing means which is stored in said storing means and a positional deviation of the images formed by said image forming means by using the position of the predetermined pattern.

38. An image forming apparatus according to claim 37, further comprising correcting means for correcting positions at which images are formed by said image forming means on the basis of the positional deviation of the images detected by said position detecting means.

39. An image forming apparatus according to claim 38, wherein said correcting means performs at least one of a mechanical correction and an electrical correction of a positional deviation of the images formed by said image forming means.

40. An image forming apparatus according to claim 39, wherein said image forming means forms an image according to an output image signal, and said correcting means changes an output timing of the image signal on the basis of the histogram.

41. An image forming apparatus according to claim 39, wherein said image forming means comprises an image holding member and an optical system for irradiating a beam onto said image holding member, and said correcting means controls the optical system according to the positional deviation of the images detected by said position detecting means.

42. An image forming apparatus according to claim 31, wherein said image forming means forms a plurality of sets of the predetermined patterns from the pattern signal, and said histogram generating means generates a plurality of histograms of each of the plurality of sets of the predetermined patterns.

43. An image forming apparatus according to claim 42, wherein said position detecting means detects positions of the plurality of sets of predetermined patterns on the basis of binarized data obtained by binarizing the plurality of the histograms of the plurality of sets of the predetermined patterns.

44. An image forming method comprising the steps of:

generating a pattern signal corresponding to a predetermined pattern;

forming the predetermined pattern from the pattern signal generated in said generating step using an image forming means, and forming images from image data using the image forming means;

a first detecting step for detecting the predetermined pattern formed in said forming step;

generating a histogram of the predetermined pattern detected in said first detecting step;

binarizing the histogram generated in said histogram generating step to generate binarized data; and a second detecting step for detecting a position of the predetermined pattern formed in said forming step on the basis of the binarized data generated in said binarizing step.

45. An image forming method according to claim 44, wherein said image forming means comprises a plurality of image forming means, each for forming different color components respectively, and wherein said second detecting step comprises a step of computing a positional deviation between a predetermined pattern of a reference color component and a predetermined pattern of at least one other color component by using the binarized data generated in said binarizing step.

46. An image forming method according to claim 44, wherein a threshold value used in binarizing step is changeable.

47. An image forming method according to claim 46, further comprising a recognizing step for recognizing whether features of the predetermined pattern are present on the basis of an output from said binarizing step, wherein when said recognizing step recognizes that the features of the predetermined pattern are not present, said binarizing step varies a binarization threshold value.

48. An image forming method according to claim 44, wherein said second detecting step detects changing points in an output of said binarizing step and detects the position of the predetermined pattern on the basis of the changing points.

49. An image forming method according to claim 44, wherein said generating step comprises storing a histogram.

50. An image forming method according to claim 44, wherein said second detecting step comprises a step of storing the binarized data output in said binarizing step, and wherein said second detecting step detects the position of the predetermined pattern by using the binarized data output in said binarizing step which is stored in said storing step and a positional deviation of the images formed in said forming step by using the position of the predetermined pattern.

51. An image forming method according to claim 50, further comprising a correcting step for correcting positions at which images are formed in said forming step on the basis of the positional deviation of the images detected in said second detecting step.

52. An image forming method according to claim 51, wherein said correcting step performs at least one of a mechanical correction and an electrical correction of a positional deviation of the images formed in said forming step.

53. An image forming method according to claim 52, wherein said forming step forms an image according to an output image signal, and said correcting step changes an output timing of the image signal on the basis of the histogram.

54. An image forming method according to claim 52, wherein said forming step irradiates a beam onto an image holding member, and said correcting step controls an optical system according to the positional deviation of the images detected in said second detecting step.

55. An image forming method according to claim 44, wherein said forming step forms a plurality of sets of the predetermined patterns from the pattern signal, and said generating step generates a plurality of histograms of each of the plurality of sets of the predetermined patterns.

56. An image forming method according to claim 55, wherein said second detecting step detects positions of the plurality of sets of predetermined patterns on the basis of binarized data obtained by binarizing the plurality of the histograms of the plurality of sets of the predetermined patterns.

* * * * *

UNITED STATES PATENT AND TRADEMARK OFFICE
CERTIFICATE OF CORRECTION

PATENT NO. : 5,576,753

DATED : November 19, 1996

INVENTORS : Kataoka et al.

It is certified that error appears in the above-identified patent and that said Letters Patent is hereby corrected as shown below:

COLUMN 9:

Line 64, "(Sill)." should read --(S111).--.

COLUMN 12:

Line 4, "MIN" should read --MAX--; and
Line 9, "MIN" should read --MAX--.

COLUMN 14:

Line 19, "<Construction of Reader>" should begin a new sub-heading;
Line 33, "conversion section" should read --conversion section)--; and
Line 46, "<Construction of Printer>" should begin a new sub-heading.

COLUMN 15:

Line 48, "<Method of Registration Correction>" should begin a new sub-heading; and
Line 52, "<Data Compression System>" should begin a new sub-heading.

UNITED STATES PATENT AND TRADEMARK OFFICE
CERTIFICATE OF CORRECTION

PATENT NO. : 5,576,753

DATED : November 19, 1996

INVENTORS : Kataoka et al.

Page 2 of 2

It is certified that error appears in the above-identified patent and that said Letters Patent is hereby corrected as shown below:

COLUMN 16:

Line 17, "<Structure of Memory>" should begin a new sub-heading; and

Line 34, "<System for Adjusting and Outputting Image Data from Reader>" should begin a new sub-heading.

Signed and Sealed this

Second Day of September, 1997

Attest:

BRUCE LEHMAN

Attesting Officer

Commissioner of Patents and Trademarks